(12) United States Patent
Ota et al.

(10) Patent No.: US 10,572,202 B2
(45) Date of Patent: Feb. 25, 2020

(54) NETWORK COMMUNICATION SYSTEM, COMMUNICATION CONTROL APPARATUS, AND RECORDING MEDIUM

(71) Applicant: RICOH COMPANY, LTD., Tokyo (JP)

(72) Inventors: Hiroshi Ota, Tokyo (JP); Kiwamu Watanabe, Kanagawa (JP); Yoshitaka Komine, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 108 days.

(21) Appl. No.: 15/726,885

(22) Filed: Oct. 6, 2017

(65) Prior Publication Data

US 2018/0101348 A1 Apr. 12, 2018

(30) Foreign Application Priority Data

Oct. 7, 2016 (JP) .................................. 2016-199289
Sep. 29, 2017 (JP) .................................. 2017-191676

(51) Int. Cl.
*G06F 3/12* (2006.01)
*H04L 29/08* (2006.01)
(Continued)

(52) U.S. Cl.
CPC .......... *G06F 3/1288* (2013.01); *G06F 3/1286* (2013.01); *H04L 67/04* (2013.01); *H04W 76/16* (2018.02); *H04W 88/10* (2013.01)

(58) Field of Classification Search
None
See application file for complete search history.

(56) References Cited

U.S. PATENT DOCUMENTS 7,986,425 B2 * 7/2011 Nakaota ................ G06F 3/1204
358/1.14
9,106,490 B2 * 8/2015 Venkitaraman ... H04L 29/12311
(Continued)

FOREIGN PATENT DOCUMENTS

| JP | 10-093614 | 4/1998 |
| JP | 2005-210588 | 8/2005 |
| JP | 2017-055372 | 3/2017 |

*Primary Examiner* — Kevin D Mew
(74) *Attorney, Agent, or Firm* — Xsensus LLP

(57) ABSTRACT

A communication control apparatus for controlling communication between at least one communication apparatus and a network apparatus residing on one network among a plurality of networks includes multiple communication controllers respectively provided for the plurality of networks. Each communication controller includes a memory that stores operation determination information to be used for determining processing to be performed on transmission-and-reception information, the transmission-and-reception information to be transmitted or received by the communication controller with respect to other communication controller or the network apparatus on the network and circuitry that acquires the operation determination information in response to receiving the transmission-and-reception information, and performs operation corresponding to the acquired operation determination information on the transmission-and-reception information. Each of the multiple communication controllers controls communication between the communication apparatus and the network apparatus residing on the network by performing the operation corresponding to the acquired operation determination information.

18 Claims, 23 Drawing Sheets

(51) Int. Cl.
*H04W 88/10* (2009.01)
*H04W 76/16* (2018.01)

(56) References Cited

U.S. PATENT DOCUMENTS

| | | | | |
|---|---|---|---|---|
| 9,197,769 | B2* | 11/2015 | Hasama | H04N 1/00413 |
| 9,367,273 | B2* | 6/2016 | Shibata | G06F 3/1236 |
| 2003/0002066 | A1* | 1/2003 | Miyano | G06F 21/608 |
| | | | | 358/1.14 |
| 2003/0074420 | A1* | 4/2003 | Hoshino | G06F 3/1222 |
| | | | | 709/218 |
| 2003/0133150 | A1* | 7/2003 | Tamai | G06F 3/1204 |
| | | | | 358/1.15 |
| 2005/0128515 | A1* | 6/2005 | Ohno | H04N 1/00204 |
| | | | | 358/1.15 |
| 2005/0216602 | A1* | 9/2005 | Armstrong | H04L 29/12113 |
| | | | | 709/250 |
| 2005/0270565 | A1* | 12/2005 | Shima | H04N 1/00915 |
| | | | | 358/1.15 |
| 2006/0002384 | A1* | 1/2006 | Chen | H04L 12/4604 |
| | | | | 370/389 |
| 2007/0011354 | A1* | 1/2007 | Ohara | G06F 3/1204 |
| | | | | 709/245 |
| 2009/0103933 | A1* | 4/2009 | Miyazaki | G03G 21/1892 |
| | | | | 399/12 |
| 2010/0123932 | A1* | 5/2010 | Nakamura | G06F 21/608 |
| | | | | 358/1.15 |
| 2010/0265539 | A1* | 10/2010 | Masuyama | G06K 15/00 |
| | | | | 358/1.15 |
| 2010/0312851 | A1* | 12/2010 | Jackson | H04L 67/104 |
| | | | | 709/217 |
| 2013/0135680 | A1* | 5/2013 | Sato | G06F 3/12 |
| | | | | 358/1.16 |
| 2014/0139859 | A1* | 5/2014 | Saito | G06F 3/1204 |
| | | | | 358/1.13 |
| 2015/0301770 | A1* | 10/2015 | Hirata | G06F 3/1286 |
| | | | | 358/1.15 |
| 2015/0304515 | A1* | 10/2015 | Kitagawa | H04N 1/00885 |
| | | | | 358/402 |
| 2016/0070995 | A1* | 3/2016 | Van Dun | G06K 15/026 |
| | | | | 358/1.18 |
| 2016/0189193 | A1* | 6/2016 | Toumayan | G06Q 30/0225 |
| | | | | 705/14.26 |
| 2016/0323472 | A1* | 11/2016 | Nakashima | H04N 1/00928 |

* cited by examiner

FIG. 16

USAGE LOG

| SELECT INTERFACE | ALL |

| INTERFACE | ADDRESS | OPERATION | STATUS | LAST UPDATED DATE/TIME |
|---|---|---|---|---|
| Net_A1 | 192.168.1.100/24 | PRINT | FINISHED | 2017/03/29 |
| Net_B1 | 172.16.10.11/24 | SCAN | FAILED | 2017/03/29 |
| Net_C1 | 10.0.10.100/24 | PRINT | FINISHED | 2017/03/29 |

CANCEL  OK

FIG. 17

USAGE LOG

| SELECT INTERFACE | NETWORK A |

| INTERFACE | ADDRESS | OPERATION | STATUS | LAST UPDATED DATE/TIME |
|---|---|---|---|---|
| Net_A1 | 192.168.1.100/24 | PRINT | FINISHED | 2017/03/29 |
|  |  |  |  |  |
|  |  |  |  |  |

CANCEL  OK

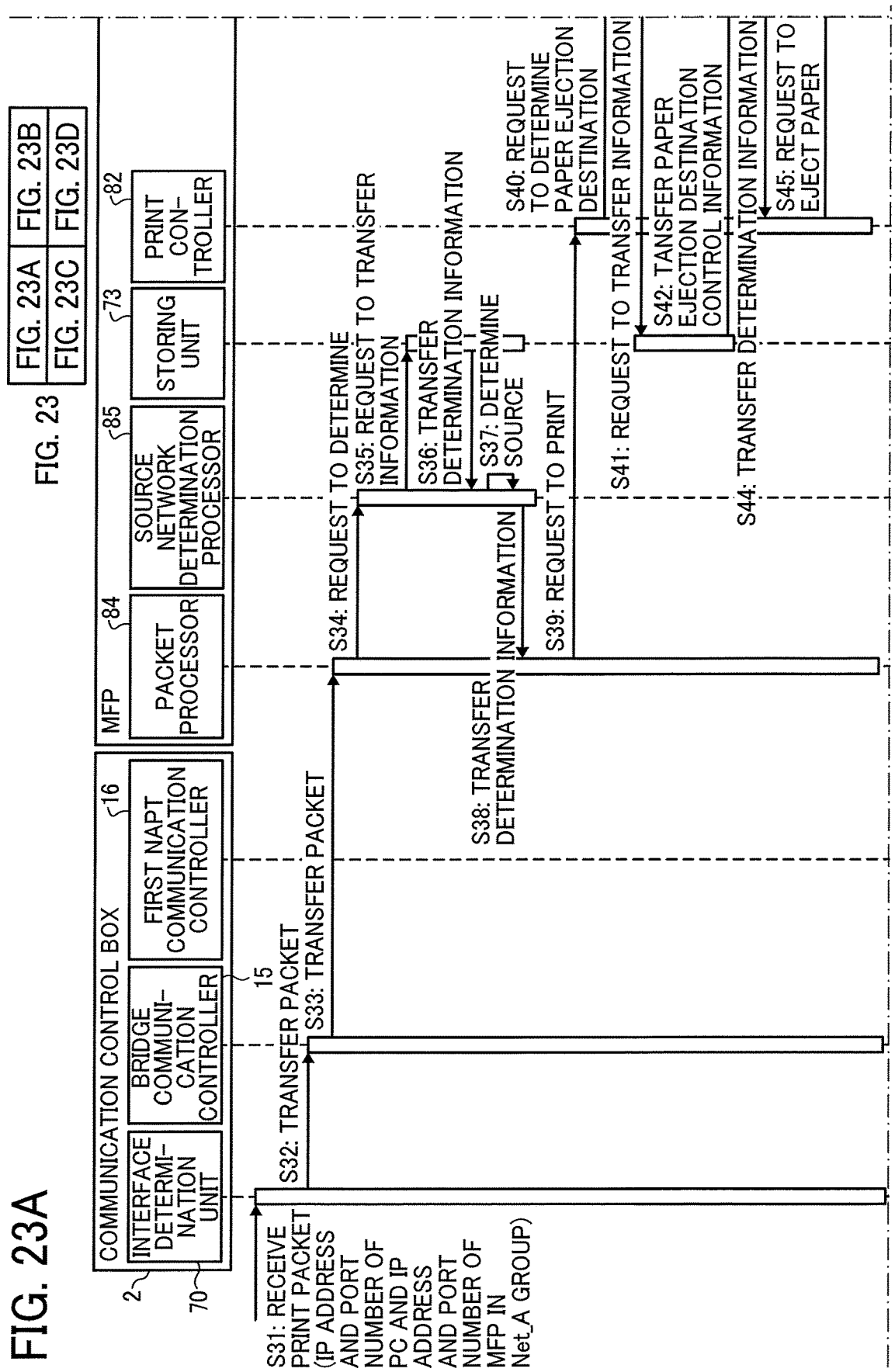

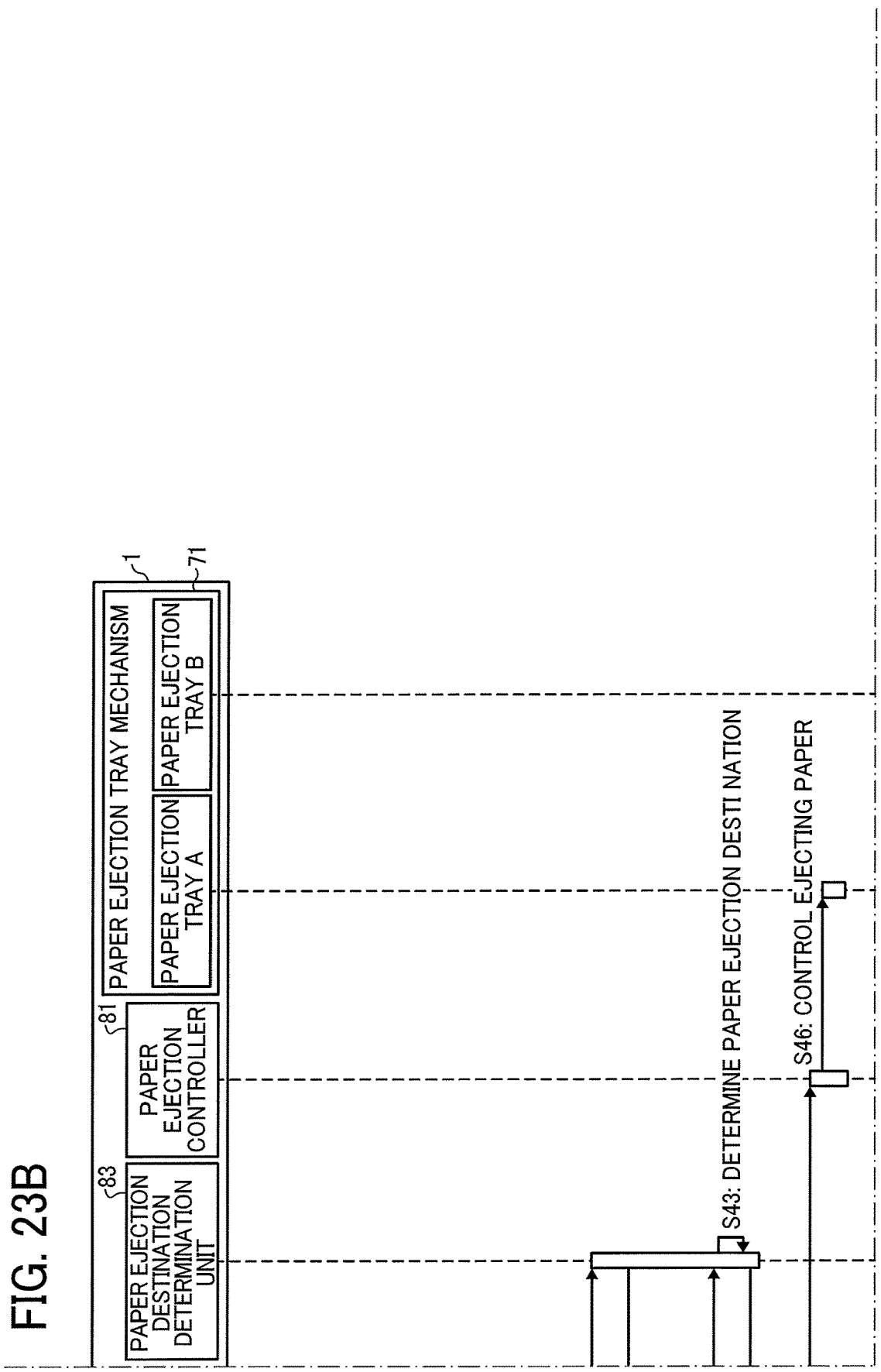

NETWORK COMMUNICATION SYSTEM, COMMUNICATION CONTROL APPARATUS, AND RECORDING MEDIUM

CROSS-REFERENCE TO RELATED APPLICATION

This patent application is based on and claims priority pursuant to 35 U.S.C. § 119(a) to Japanese Patent Applications No. 2016-199289, filed on Oct. 7, 2016 and No. 2017-191676, filed on Sep. 29, 2017 in the Japan Patent Office, the entire disclosure of which is hereby incorporated by reference herein.

BACKGROUND

Technical Field

The present invention relates to a network communication system, a communication control apparatus, and a non-transitory recording medium storing a communication control program.

Background Art

Conventionally, in many cases, in government and other public offices and hospitals etc., multiple networks are used depending on usage, for example, a network for dealing with highly confidential information such as personal information (data) etc. is separated from a network for dealing with lower confidential information such as office work etc. In addition, if a company is merged with another company due to mergers and acquisitions etc., each department uses a different network respectively in some cases even if the departments belong to the same company on the same floor in the same building.

In this case, if an image forming apparatus such as a multifunction peripheral (MFP) or a printer etc. is set up for each network, management cost rises, and it is irrationally to set up multiple image forming apparatuses because multiple image forming apparatuses occupy more space on the floor. Therefore, it is requested to reduce the number of image forming apparatuses to be set up and connect multiple networks to one image forming apparatus to save space.

SUMMARY

Example embodiments of the present invention provide a novel communication control apparatus for controlling communication between at least one communication apparatus and a network apparatus residing on one network among a plurality of networks includes multiple communication controllers respectively provided for the plurality of networks. Each communication controller includes a memory that stores operation determination information to be used for determining processing to be performed on transmission-and-reception information, the transmission-and-reception information to be transmitted or received by the communication controller with respect to other communication controller or the network apparatus on the network and circuitry that acquires the operation determination information in response to receiving the transmission-and-reception information, and performs operation corresponding to the acquired operation determination information on the transmission-and-reception information. Each of the multiple communication controllers controls communication between the communication apparatus and the network apparatus residing on the network by performing the operation corresponding to the acquired operation determination information.

Further example embodiments of the present invention provide a network communication system and a non-transitory recording medium storing a communication control program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 16 is a diagram illustrating a screen displaying the usage log as an embodiment of the present invention;

FIG. 17 is a diagram illustrating a screen displaying the usage log as an embodiment of the present invention;

FIGS. 23A, 23B, 23C, and 23D are sequence charts illustrating an operation of controlling destination of paper ejection trays for each network in the network communication system as an embodiment of the present invention.

Figure 1:
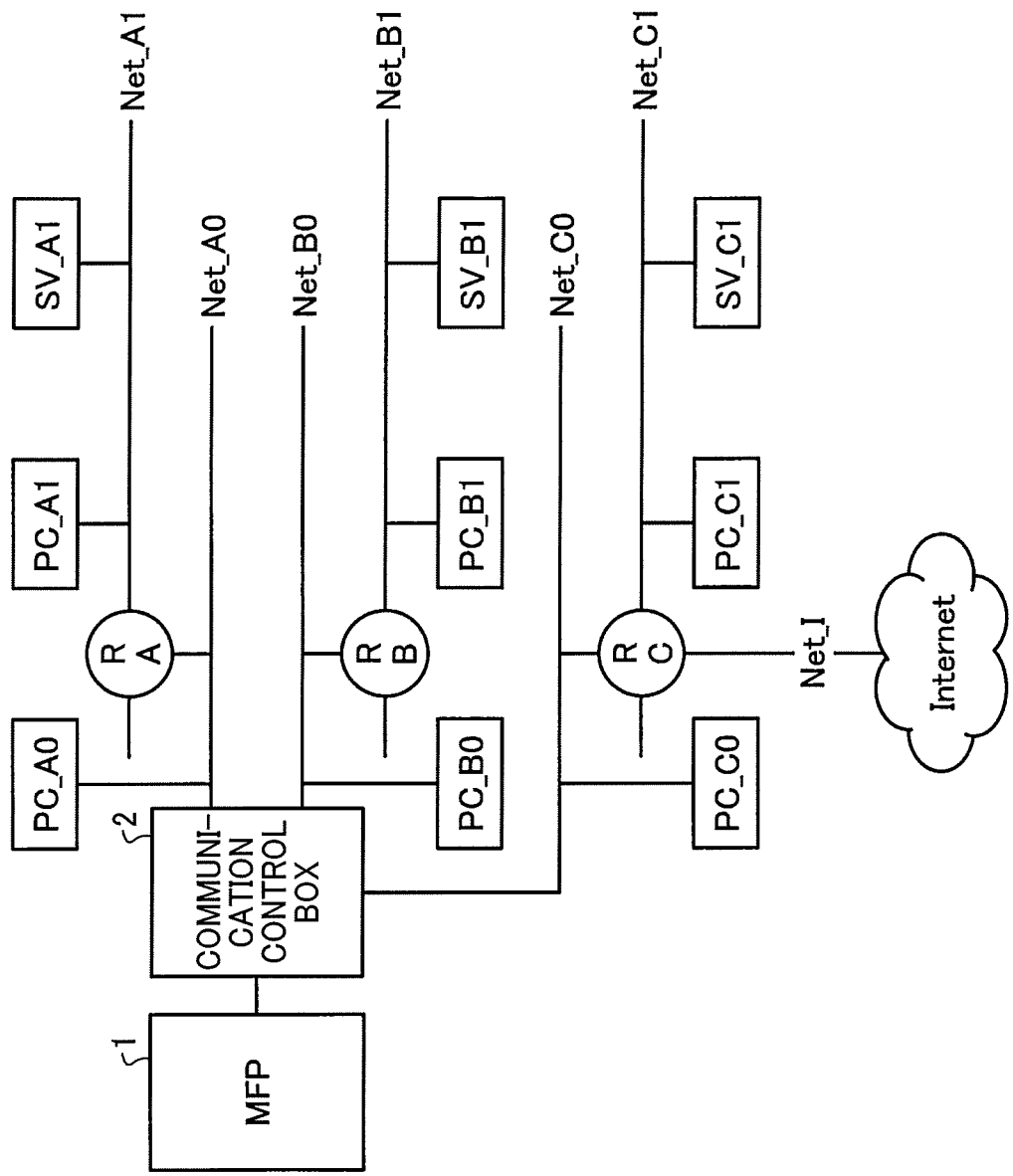
FIG. 1 is a diagram illustrating a configuration of a network communication system as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Exemplary embodiments of this disclosure are now described below with reference to the accompanying drawings.

If one image forming apparatus processes packet information transferred via multiple networks, in routing control using Transmission Control Protocol/Internet Protocol (TCP/IP) protocol stack, it is possible to perform mistransmission that a destination from the image forming apparatus is wrong for example. That may cause a security problem, and a mechanism for preventing the security problem is required. In addition, for example, in case of receiving packets from terminals whose IP addresses are the same in different networks, it is possible to leak the packets to other networks. That is not preferable from the viewpoint of security, and a mechanism for preventing the problem is required.

A network communication system in this embodiment is described below. In the network communication system in this embodiment, assuming that a router apparatus is laid out in multiple networks separated so that the networks cannot communicate with each other, routing to a network other than the network connected directly is also controlled. As a result, it is possible to perform communication via the router apparatus among multiple networks and utilize an image forming apparatus such as a MFP etc. in the large network.

First Embodiment

First, FIG. 1 is a diagram illustrating a configuration of the network communication system in this embodiment. As illustrated in FIG. 1, the network communication system in this embodiment includes a MFP 1, a communication control box 2, and multiple networks Net_A0 to Net_C0, Net_A1 to Net_C1, and Net_I. Here, the MFP 1 is an example of a communication apparatus. However, any apparatus that can perform network communication may be used as the MFP 1 such as a projector compatible with network communication and an electronic whiteboard compatible with network communication etc. In addition, in this embodiment, the MFP 1 and the communication control box 2 are illustrated as physically separated apparatuses. However, for example, the communication control box 2 may be implemented as an extension board of the MFP 1, and it is possible to integrate the MFP 1 and the communication control box 2 in a case etc.

The MFP 1 is connected to multiple networks Net_A0, Net_B0, and Net_C0 via the communication control box 2. A network interface of the MFP 1 has MAC address 00-00-5E-00-53-22.

The networks Net_A0, Net_B0, and Net_C0 are connected to the networks Net_A1, Net_B1, and Net_C1 via routers R_A, R_B, and R_C respectively. The network Net_I is connected to the networks Net_C0 and Net_C1 via the router R_C. The networks Net_C0 and Net_C1 are connected to the Internet via the router R_C and the network Net_I. Here, in this embodiment, the networks Net_A and Net_B cannot be connected to the Internet in consideration of communication security. However, it is possible to connect the networks Net_A and Net_B to the Internet.

Here, the networks connected to the MFP 1 are divided into a group Net_A including the networks Net_A0 and Net_A1, a group Net_B including the networks Net_B0 and Net_B1, and a group Net_C including the networks Net_C0, Net_C1, and Net_I. Those groups are separated from each other so that Internet Protocol communication cannot be performed. Here, in this embodiment, it is assumed that the network groups are separated so that IP communication cannot be performed between the different network systems. However, in accordance with security requisite etc., it is possible to perform communication between different network systems.

A personal computer (PC) PC_A0 is connected to the network Net_A0, a PC PC_B0 is connected to the network Net_B0, and a PC PC_C0 is connected to the network Net_C0 respectively. A PC PC_A1 and a server apparatus SV_A1 as examples of network apparatuses are connected to the network Net_A1. A PC PC_B1 and a server apparatus SV_B1 as examples of network apparatuses are connected to the network Net_B1. A PC PC_C1 and a server apparatus SV_C1 are connected to the network Net_C1.

Each PC such as the PC PC_A1 etc. requests the MFP 1 to print and transfers apparatus information to the MFP 1 using Simple Network Management Protocol (SNMP). The MFP 1 transfers file information generated by scanning a document to the server apparatus SV_A1 etc. Here, request for print, transferring apparatus information using SNMP, and transferring file information generated by scanning a document are just examples, and other communication can also be performed.

The communication control box 2 restricts communication among network groups Net_A, Net_B, and Net_C and enables communication between the network Net_A and the MFP 1, the network Net_B and the MFP 1, and the network Net_C and the MFP 1.

Next, example network addresses of the networks are described in Table 1 described below.

TABLE 1

| Apparatus | Network address/ netmask | Description |
| --- | --- | --- |
| Net_A0 | 192.168.1.0/24 | |
| Net_A1 | 192.168.10.0/24 | |
| Net_B0 | 172.16.1.0/24 | |
| Net_B1 | 172.16.10.0/24 | |
| Net_C0 | 10.0.1.0/24 | |
| Net_C1 | 10.0.10.0/24 | |
| Net_I | 203.0.113.0/29 | Segment for going out to the Internet |

As described in Table 1, the network address of the network Net_A0 is set to "192.168.1.0/24". Network address of the network Net_A1 is set to "192.168.10.0/24". Network address of the network Net_B0 is set to "172.16.1.0/24". Network address of the network Net_B1 is set to "172.16.10.0/24". Network address of the network Net_C0 is set to "10.0.1.0/24". Network address of the network Net_C1 is set to "10.0.10.0/24". Network address of the network Net_I is set to "203.0.113.0/29". It should be noted that the network Net_I includes a segment for connecting to the Internet.

As described in Table 1, the network addresses of the networks are configured so that the network addresses do not overlap. Actually, in other cases, other network addresses can be configured so that IP addresses of the MFP 1 and the server apparatus that communicates with the MFP 1 directly does not overlap. Even if the IP address of the server apparatus that communicates with the MFP 1 directly overlaps, the configuration can be made so that static Network Address Port Translation (NAPT) is set.

Next, IP addresses and settings of the whole system are described in Table 2 below.

TABLE 2

| Apparatus | IP address/ netmask | default gateway | Description |
| --- | --- | --- | --- |
| MFP | 192.168.1.10/24 | 192.168.1.1/24 | MFP |
| PC_A0 | 192.168.1.100/24 | 192.168.1.1/24 | |
| R_A | 192.168.1.1/24<br>192.168.10.1/24 | — | Router |
| PC_A1 | 192.168.10.100/24 | 192.168.10.1/24 | |
| SV_A1 | 192.168.10.11/24 | 192.168.10.1/24 | |
| PC_B0 | 172.16.1.100/24 | 172.16.1.1/24 | |

TABLE 2-continued

| Apparatus | IP address/ netmask | default gateway | Description |
| --- | --- | --- | --- |
| R_B | 172.16.1.1/24<br>172.16.10.1/24 | — | Router |
| PC_B1 | 172.16.10.100/24 | 172.16.10.1/24 | |
| SV_B1 | 172.16.10.11/24 | 172.16.10.1/24 | |
| PC_C0 | 10.0.1.100/24 | 10.0.1.1/24 | |
| R_C | 10.0.1.1/24<br>10.0.10.1/24<br>203.0.113.2/29 | 203.0.113.1/29 | Router that may transfer packets to the Internet |
| PC_C1 | 10.0.10.100/24 | 10.0.10.1/24 | |
| SV_C1 | 10.0.10.11/24 | 10.0.10.1/24 | |

As described in Table 2, IP address of the MFP 1 is set to "192.168.1.10/24", and a default gateway is set to "192.168.1.1/24". IP address of the PC PC_A0 is set to "192.168.1.100/24", and a default gateway is set to "192.168.1.1/24". IP address of the router R_A is set to "192.168.1.1/24", and a subnet mask is set to "192.168.10.1/24".

IP address of the PC PC_A1 is set to "192.168.10.100/24", and a default gateway is set to "192.168.10.1/24". IP address of the server apparatus SV_A1 is set to "192.168.10.11/24", and a default gateway is set to "192.168.10.1/24". IP address of the PC PC_B0 is set to "172.16.1.100/24", and a default gateway is set to "172.16.1.1/24".

IP address of the router R_B is set to "172.16.1.1/24", and a subnet mask is set to "172.16.10.1/24". IP address of the PC PC_B1 is set to "172.16.10.100/24", and a default gateway is set to "172.16.10.1/24". IP address of the server apparatus SV_B1 is set to "172.16.10.11/24", and a default gateway is set to "172.16.10.1/24". IP address of the PC PC_C0 is set to "10.0.1.100/24", and a default gateway is set to "10.0.1.1/24".

IP addresses of the router R_C that may transfer packet information (an example of transmission-and-reception information) to the Internet are set to "10.0.1.1/24" and "10.0.10.1/24", subnet mask of the router R_C is set to "203.0.113.2/29", and default gateway of the router R_C is set to "203.0.113.1/29". IP address of the PC PC_C1 is set to "10.0.10.100/24", and a default gateway is set to "10.0.10.1/24". IP address of the server apparatus SV_C1 is set to "10.0.10.11/24", and a default gateway is set to "10.0.10.1/24".

As described in Table 2 above, one IP address that enables to perform communication via the network is allocated to each PC and server apparatus. In order to enable to perform communication via the connected networks, multiple IP addresses are allocated to the router. In laying out one server apparatus and router logically, it is possible to implement the server apparatus and the router using multiple apparatuses redundantly.

Figure 2:
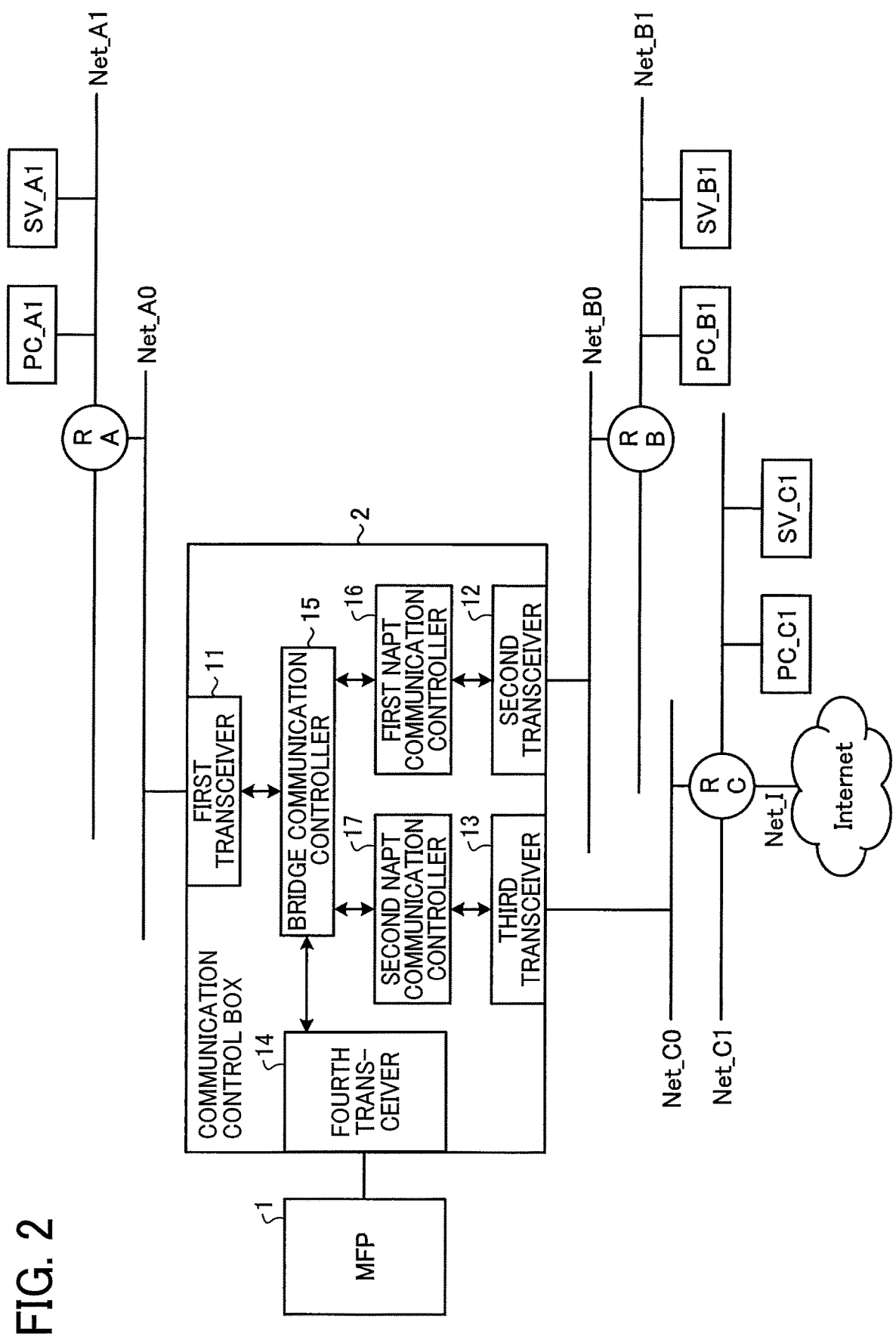
FIG. 2 is a block diagram illustrating functions of a communication control box as an embodiment of the present invention.

FIG. 2 is a block diagram illustrating functions of the communication control box 2 in this embodiment implemented by executing a network control program stored in a read only memory (ROM), a random access memory (RAM), or a hard disk drive (HDD) by a central processing unit (CPU) included in a controller of the communication control box 2.

That is, the CPU in the communication control box 2 implements a first transceiver 11, a second transceiver 12, a third transceiver 13, a fourth transceiver 14, a bridge communication controller 15 (corresponding to the Net_A0 and Net_A1), a first Network Address Port Translation (NAPT) communication controller 16, and a second NAPT communication controller 17 (corresponding to the Net_C0 and Net_C1) by executing the network control program. The bridge communication controller 15, the first NAPT communication controller 16 (corresponding to Net_B0 and Net_B1), and the second NAPT communication controller 17 are examples of the communication controller.

Here, the components from the first transceiver 11 to the second NAPT communication controller 17 described above are implemented by using software. However, all of the components or a part of the components may be implemented by hardware such as an integrated circuit (IC) etc.

In addition, the network control program may be provided by being stored in a computer readable, recording medium, such as a compact disc read only memory (CD-ROM) and a flexible disk (FD) in a file format installable or executable. In addition, the network control program may be provided by being stored in a computer readable, recording medium, such as a compact disc recordable (CD-R), a digital versatile disc (DVD), a Blu-ray (registered trademark) disc, and a semiconductor memory etc. In addition, the network control program may be provided by being installed via a network such as the Internet etc. In addition, the network control program may be provided by being installed in the ROM included in the apparatus preliminarily.

The transceivers 11 to 14 receive packet information transferred via the network and transfer the packet information. Examples of the transceivers 11 to 14 are a network interface for performing Ethernet (registered trademark) communication and other network interfaces such as an interface corresponding to a PCI express card and a Universal Serial Bus (USB) interface etc. In FIG. 2, the first transceiver 11, the second transceiver 12, the third transceiver 13, and the fourth transceiver 14 are illustrated as wired interfaces. However, it is possible to adopt wireless interfaces for the first transceiver 11, the second transceiver 12, the third transceiver 13, and the fourth transceiver 14.

The bridge communication controller 15 determines a destination of the packet information received via the transceivers 11 to 14 and overwrites the packet information etc. The NAPT communication controllers 16 and 17 determine a destination of the packet information received via the transceivers 11 to 14 and overwrites the packet information etc. The NAPT communication controllers 16 and 17 include a NAPT table for performing NAPT operation and convert IP addresses and port numbers using the NAPT table (performing NAPT operation).

It should be noted that, in the NAPT communication controllers 16 and 17, network resources such as a routing table, a NAPT table, and a session table (for managing a source port and a destination port for TCP/UDP communication) etc. are separated. That is, each of the NAPT communication controllers 16 and 17 includes separated network resources respectively.

Figure 3:
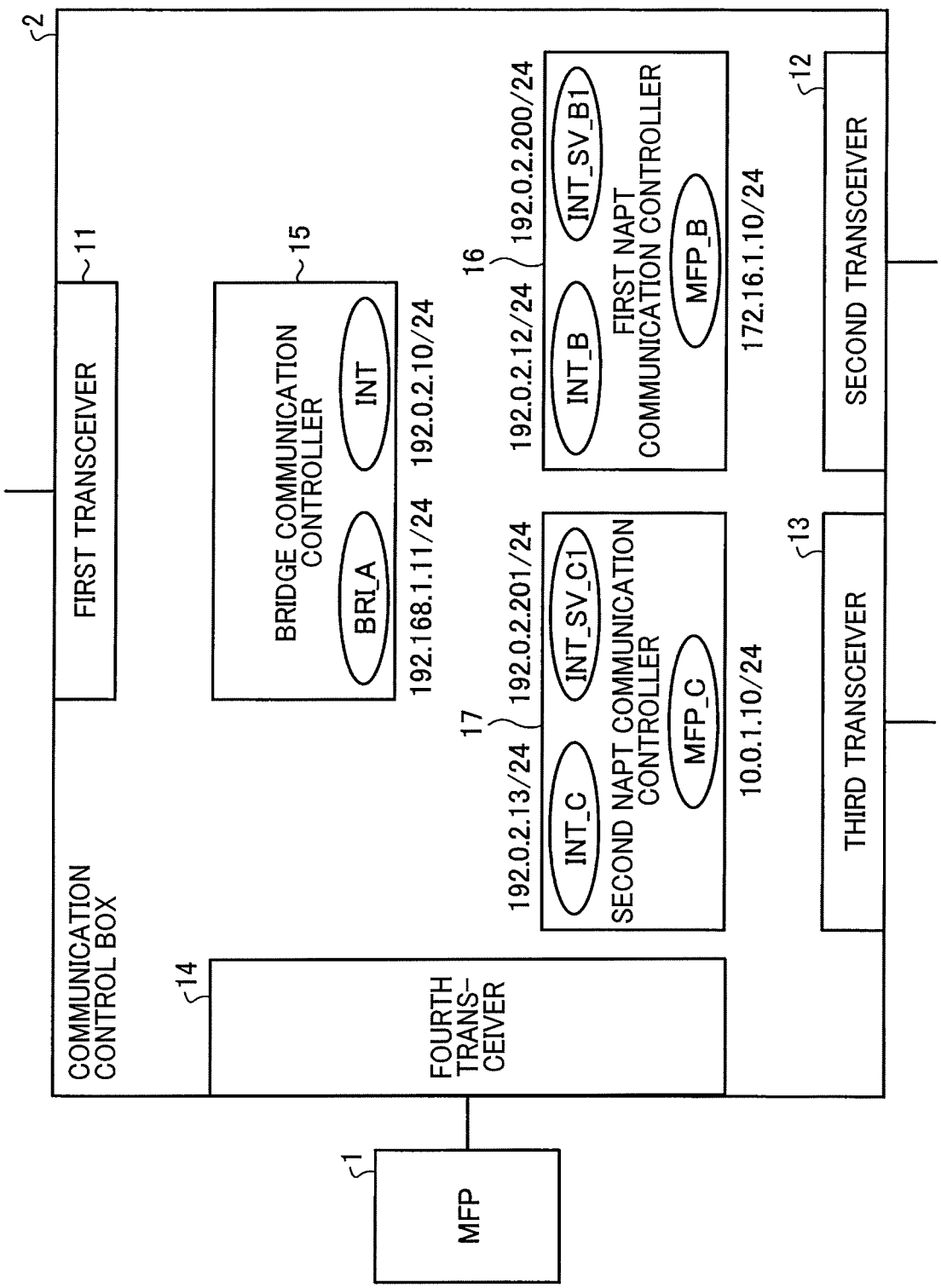
FIG. 3 is a diagram illustrating IP addresses of units in the communication control box as an embodiment of the present invention.

IP addresses of the bridge communication controller 15 in the communication control box 2, the first NAPT communication controller, and the second NAPT communication controller are illustrated in FIG. 3 and Table 3 as described below.

TABLE 3

| Apparatus | IP address/ netmask | Description |
|---|---|---|
| BRI_A | 192.168.1.11/24 | IP address as a source in transferring a packet received from the second and third transceivers to the MFP |

TABLE 3-continued

| Apparatus | IP address/ netmask | Description |
|---|---|---|
| INT | 192.168.2.10/24 | IP address as a source in transferring a packet received from the MFP to the second and third transceivers used within the communication control box only and not be used in the network |
| INT_B | 192.0.2.12/24 | IP address as a source in transferring a packet received from the second transceiver to the bridge communication controller used within the communication control box only and not be used in the network |
| INT_C | 192.0.2.13/24 | IP address as a source in transferring a packet received from the third transceiver to the bridge communication controller used within the communication control box only and not be used in the network |
| MFP_B | 172.16.1.10/24 | IP address for accessing the MFP from the network group Net_B |
| INT_SV_B1 | 192.0.2.200/24 | IP address for transferring a packet received from the bridge communication controller to the SV_B in the network group Net_B used within the communication control box only. |
| MFP_C | 10.0.1.10/24 | IP address for accessing the MFP from the network group Net_C |
| INT_SV_C1 | 192.0.2.201/24 | IP address for transferring a packet received from the bridge communication controller to the SV_C in the network group Net_C used within the communication control box only. |

As illustrated in FIG. 3 and Table 3, the IP address BRI_A of the bridge communication controller 15 used in transferring the packet information received via the second transceiver 12 and the third transceiver 13 to the MFP 1 corresponds to "192.168.1.11/24". In addition, the IP address INT of the bridge communication controller 15 used only inside the communication control box 2 in transferring the packet information received from the MFP 1 to the second transceiver 12 and the third transceiver 13 corresponds to "192.0.2.10/24". Here, the IP address INT as "192.0.2.10/24" is not used in the networks.

The IP address INT_B of the first NAPT communication controller 16 used within the communication control box 2 in transferring the packet information received via the second transceiver 12 to the bridge communication controller 15 corresponds to "192.0.2.12/24". The IP address INT_B as "192.0.2.12/24" is not used in the networks either.

The IP address INT_C of the second NAPT communication controller 17 used within the communication control box 2 in transferring the packet information received via the second transceiver 12 to the bridge communication controller 15 corresponds to "192.0.2.13/24". The IP address INT_B as "192.0.2.13/24" is not used in the networks either.

The IP address MFP_B of the first NAPT communication controller 16 for accessing the MFP 1 from the network group Net_B corresponds to "172.16.1.10/24". The IP address INT_SV_B1 of the first NAPT communication controller 16 used inside the communication control box 2 in transferring the packet information received from the bridge communication controller 15 to the server apparatus SV_B in the network group Net_B corresponds to "192.0.2.200/24".

The IP address MFP C of the second NAPT communication controller 17 for accessing the MFP 1 from the network group Net_C corresponds to "10.0.1.10/24". The IP address INT_SV_C1 of the second NAPT communication controller 17 used inside the communication control box 2 in transferring the packet information received from the bridge communication controller 15 to the server apparatus SV_C in the network group Net_C corresponds to "192.0.2.201/24".

The IP address as "192.0.2.0/24" is reserved for documentation in Request For Comments (RFC) 5737 and is not used in the networks. In the network communication system in this embodiment, communication within the communication control box 2 is performed using the TP address "192.0.2.0/24" as an example. However, whichever IP address may be used within the communication control box 2 as long as the IP address does not overlap with IP addresses used in the networks.

Figure 4:
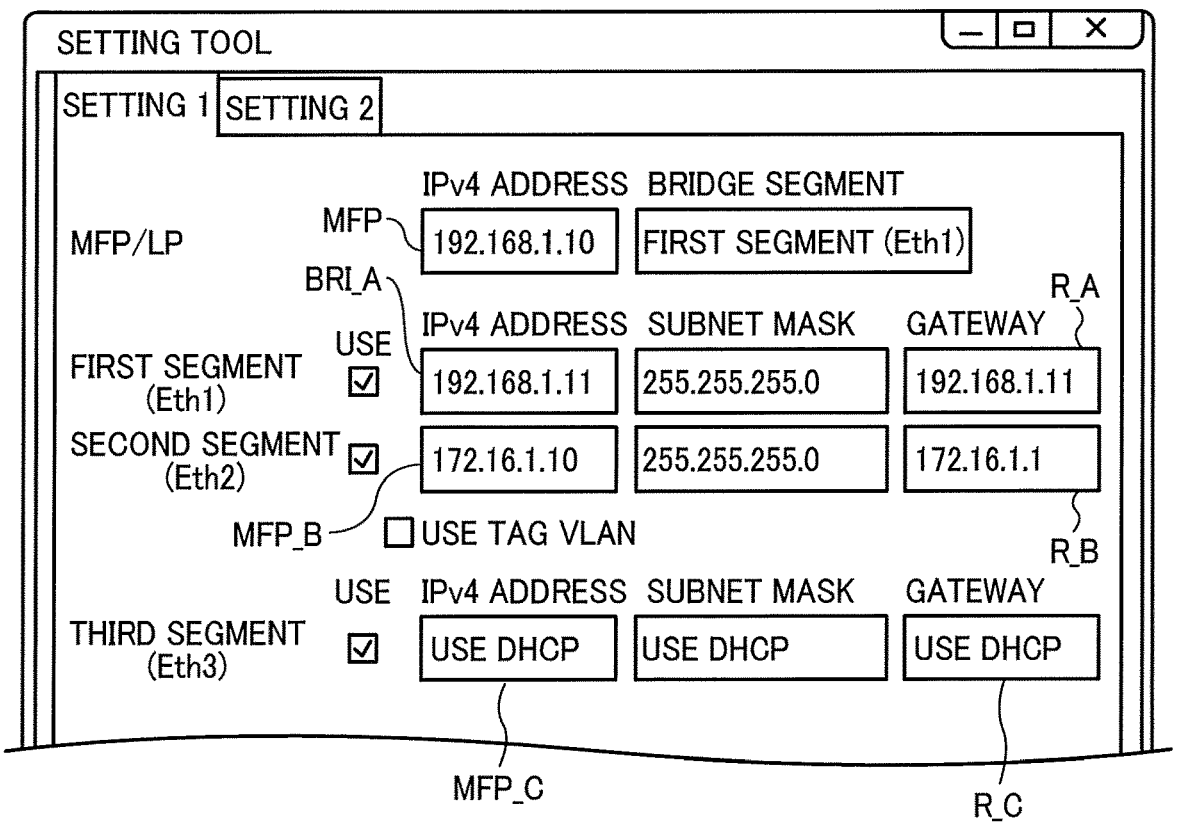
FIG. 4 is a diagram illustrating a basic setting screen of the communication control box as an embodiment of the present invention.
Figure 5:
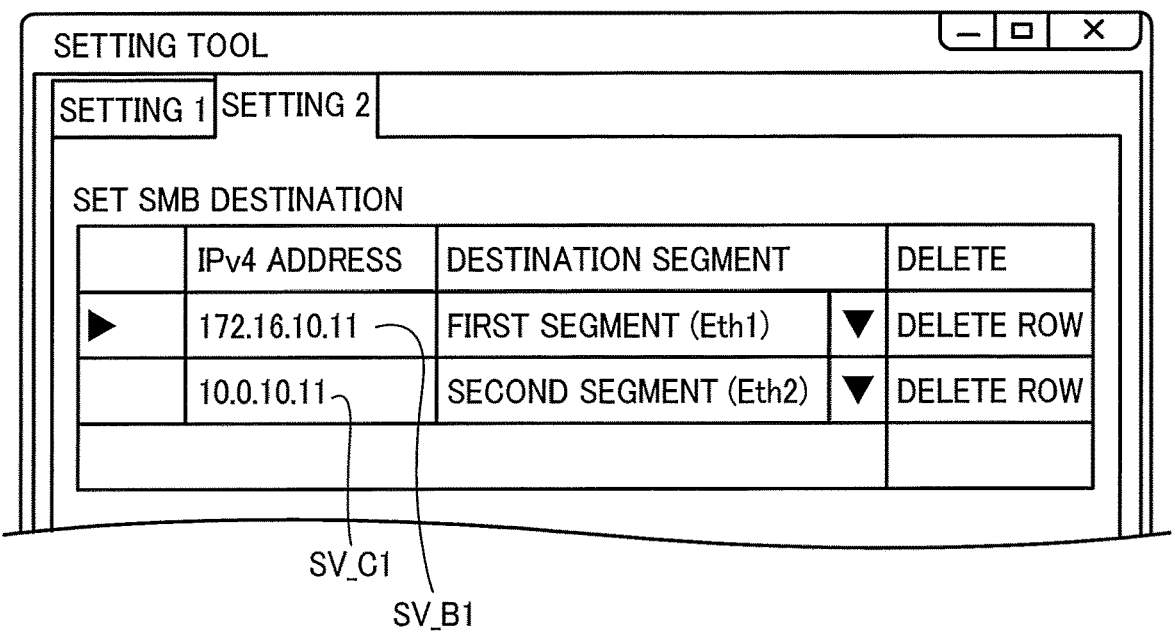
FIG. 5 is a diagram illustrating a server setting screen of the communication control box as an embodiment of the present invention.

FIG. 4 is a diagram illustrating a basic setting screen of the communication control box 2 in this embodiment. In FIG. 4, as a basic setting screen, an input box for IP address (in this case, Internet Protocol version 4 (IPv4) address or IPv6 address) of the MFP 1, an input box for a gateway such as the routers R_A to R_C etc., and an input box for IP address BRI_A of the bridge communication controller 15 etc. are included. FIG. 5 is a diagram illustrating a server setting screen of the communication control box 2 in this embodiment. In FIG. 5, input boxes for IP addresses (IPv4 addresses) of the server apparatus SV_B1 and SV_C1 are included. The values input on the setting screens described above are used for controlling communication between apparatuses.

It should be noted that values such as IP address, netmask, and gateway address etc. may be acquired using Dynamic Host Configuration Protocol (DHCP). The MAC address of the router R_A is acquired from the IP address of the router R_A by the communication control box 2 from the IP address of the router R_A using Address Resolution Protocol as a communication protocol for acquiring MAC address of Ethernet (registered trademark) from IP address. Similarly, the MAC address of the MFP 1 is acquired using the IP address of the MFP. Of course, MAC address may be registered as is. It should be noted that it is possible to operate the system easily by managing the system using IP address compared to registering MAC address.

Figure 6:
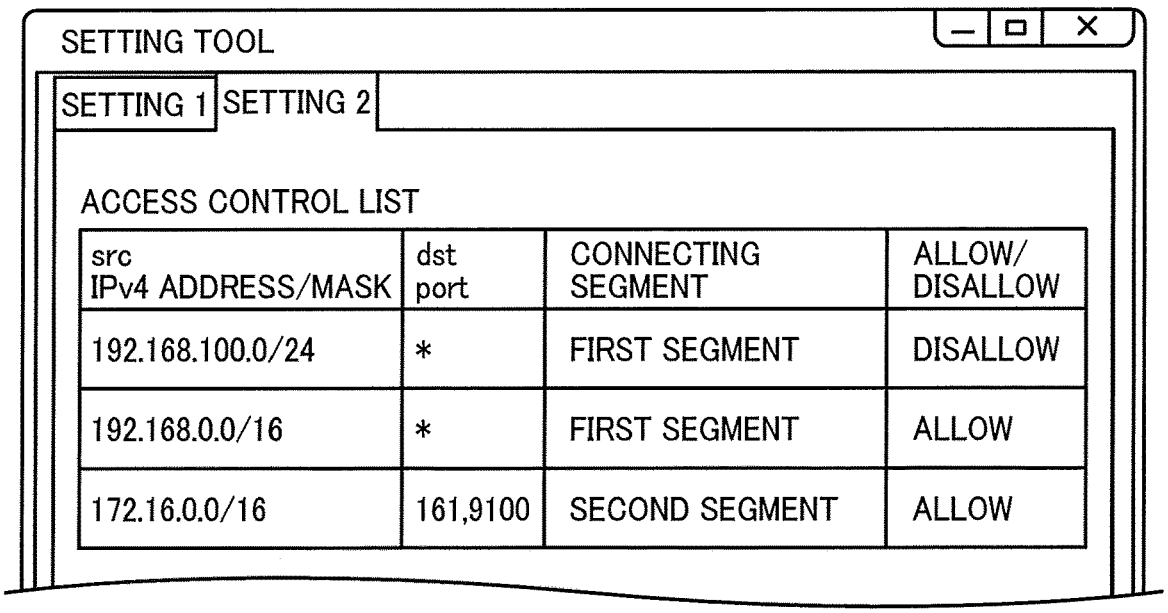
FIG. 6 is a diagram illustrating an access control list of the communication control box as an embodiment of the present invention.

FIG. 6 is a diagram illustrating an access control list of the communication control box 2 in this embodiment. In FIG. 6, a setting screen for controlling access to the MFP 1 is illustrated. In this case, it is possible to add access control using a black list and white list. In FIG. 6, settings are configured using IP address, mask, and destination port such as "161 and 9100" etc. However, it is possible to control access by using IP address and an interface such as the first transceiver 11, the second transceiver 12, the third transceiver 13, and the fourth transceiver 14 etc.

Figure 7:
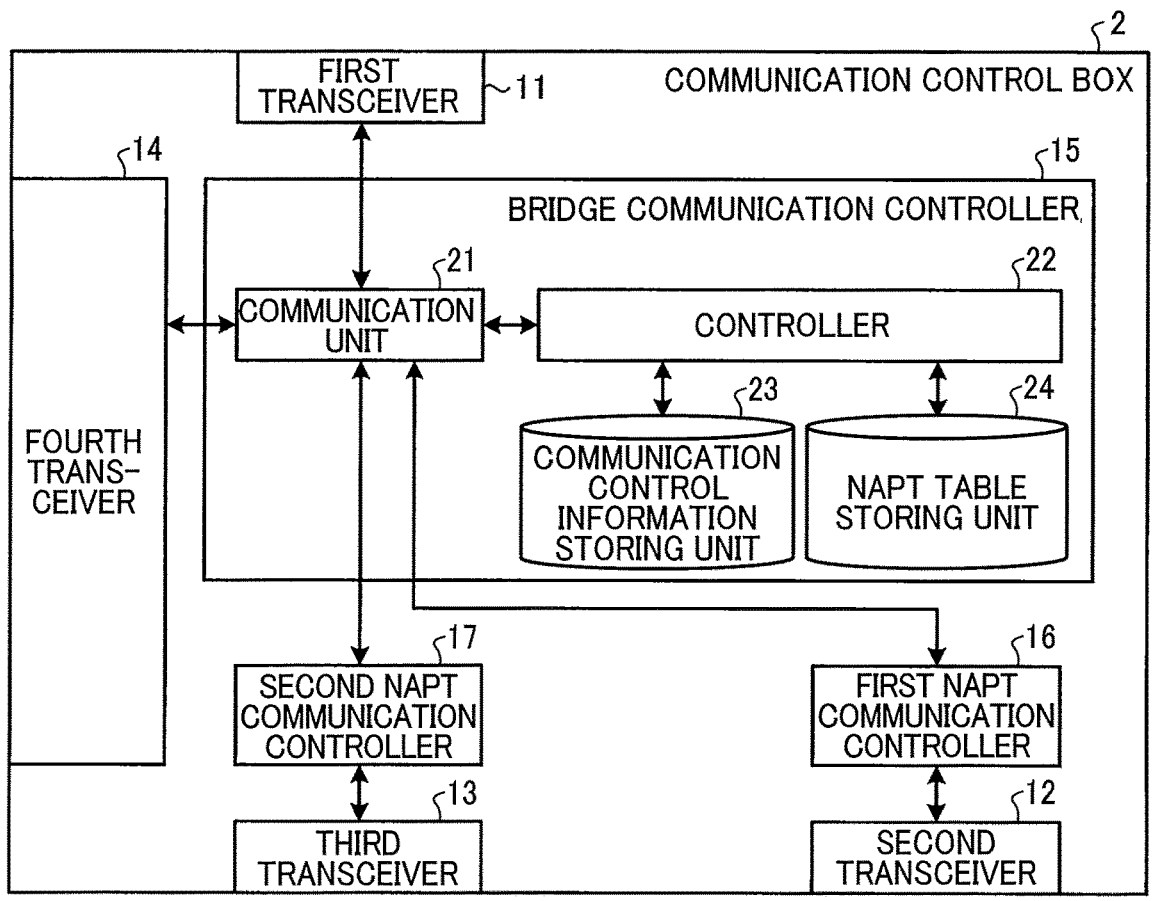
FIG. 7 is a diagram illustrating a configuration of a bridge communication controller as an embodiment of the present invention.

FIG. 7 is a diagram illustrating a configuration of the bridge communication controller 15 in this embodiment. As illustrated in FIG. 7, the bridge communication controller 15 includes a communication unit 21, a controller 22 (an example of an acquisition unit), a communication control information storing unit 23 (an example of a storing unit), and a NAPT table storing unit 24. The communication control information storing unit 23 and the NAPT table storing unit 24 are implemented in the storing unit such as the ROM and RAM etc. included in the bridge communication controller 15. By contrast, the communication unit 21 and the controller 22 are implemented using software by executing the network control program by the CPU in the bridge communication controller 15. It should be noted that both of the communication unit 21 and the controller 22 or either one of the communication unit 21 and the controller 22 may be implemented using hardware.

The controller 22 controls the communication unit 21 in the basis of communication control information stored in the communication control information storing unit 23. In accordance with the control by the controller 22, the communication unit 21 transfers the packet information received from the first transceiver 11, the second transceiver 12, the third transceiver 13, and the fourth transceiver 14 and overwrites the packet information including NAPT operation.

Figure 8:
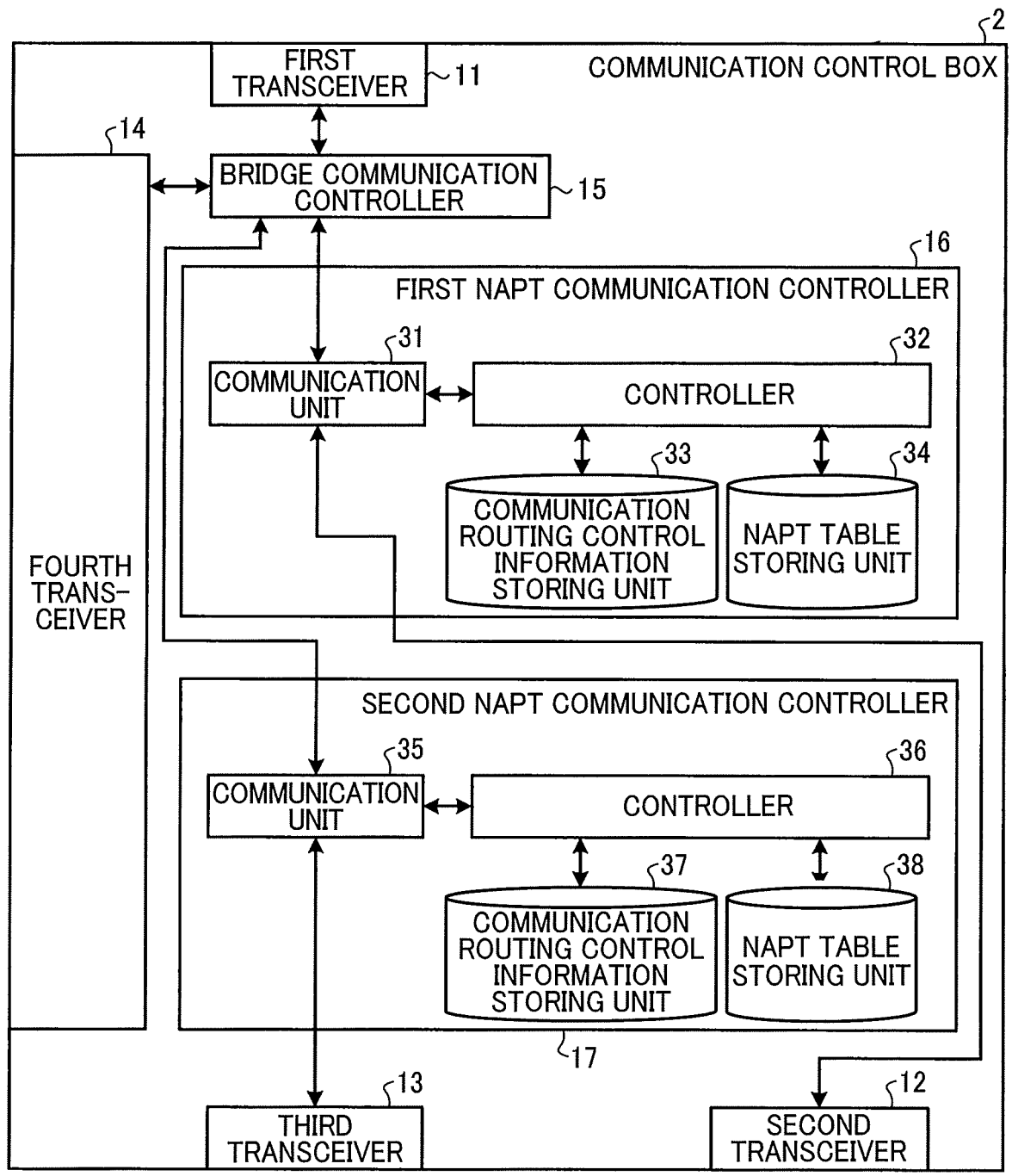
FIG. 8 is a diagram illustrating a configuration of a NAPT communication controller as an embodiment of the present invention.

FIG. 8 is a diagram illustrating a configuration of the first NAPT communication controller 16 and the second NAPT communication controller 17 in this embodiment. As illustrated in FIG. 8, the NAPT communication controllers 16 and 17 include communication units 31 and 35, controllers 32 and 36 (an example of an acquisition unit), communication routing control information storing units 33 and 37 (an example of a storing unit), and NAPT table storing units 34 and 38 respectively. The communication routing control information storing units 33 and 37 and the NAPT table storing units 34 and 38 are implemented in the storing unit such as the ROM and RAM etc. included in the first NAPT communication controller 16 and the second NAPT communication controller 17. By contrast, the communication units 31 and 35 and the controllers 32 and 36 are implemented using software by executing the network control program by the CPU in the NAPT communication controllers 16 and 17. It should be noted that all of the communication units 31 and 35 and the controllers 32 and 36 or a part of the communication units 31 and 35 and the controllers 32 and 36 may be implemented using hardware.

In the basis of communication routing control information stored in the communication routing control information storing units 33 and 37 and information stored in the NAPT table storing units 34 and 38, the controllers 32 and 36 controls the communication units 31 and 35. In the communication routing control information storing units 33 and 37, control information for performing internal communication or external communication such as a flow table (with reference to Tables 7 and 8 described later) and an Address Resolution Protocol (ARP) table etc. are stored. In accordance with the control by the controllers 32 and 36, the communication units 31 and 35 transfer the packet information received from the first transceiver 11, the second transceiver 12, the third transceiver 13, and the fourth transceiver 14 and overwrite the packet information including NAPT operation.

Each of the bridge communication controller 15, the first NAPT communication controller 16, and the second NAPT communication controller 17 includes an independent routing table respectively. Table 4 described below is an example of the routing table stored in the NAPT table storing unit 34 included in the first NAPT communication controller 16.

TABLE 4

| Destination/netmask | Gateway |
|---|---|
| 0.0.0.0/0 | 172.16.1.1 [R_B] |

In Table 4, the default gateway corresponds to "172.16.1.1 [the router R_B]". In this case, only one gateway is configured. However, multiple routers may be configured in accordance with the configuration of the network.

Table 5 described below is an example of the routing table stored in the NAPT table storing unit 38 included in the second NAPT communication controller 17.

TABLE 5

| Destination/netmask | Gateway |
|---|---|
| 0.0.0.0/0 | 10.0.1.1 [R_C] |

In Table 5, the default gateway corresponds to "10.0.1.1 [the router R_C]". In this case, only one gateway is configured. However, multiple routers may be configured in accordance with the configuration of the network.

Each of the NAPT communication controllers 16 and 17 are implemented using Network Address Port Translator (NAPT). However, the NAPT communication controllers 16 and 17 may be implemented using Network Address Translator (NAT). In this case, there are two NAPT communication controllers, the first NAPT communication controller 16 and the second NAPT communication controller 17. However, more than three NAPT communication controllers may be implemented.

Next, Table 6 described below describes the flow table stored in the communication control information storing unit 23 included in the bridge communication controller 15.

TABLE 6

| | In port | Type | Source (src) | Destination (dst) | Action |
|---|---|---|---|---|---|
| 1 | First transceiver | IP | 192.0.2.0/24 | ANY | Drop |
| 2 | Fourth transceiver | IP | 192.0.2.0/24 | ANY | Drop |
| 3 | First transceiver | IP | 192.168.100.0/24 | ANY | Drop |
| 4 | First transceiver | IP | 192.168.0.0/16 | ANY | Output (Fourth transceiver) |
| 5 | First NAPT communication controller | ANY | ANY | 192.0.2.10 [INT] | NAPT (SNAT, 192.168.1.11 [BRI_A]) NAPT (DNAT, 192.168.1.10 [MFP]) mod_mac (R_A) Output (Fourth transceiver) |
| 6 | Second NAPT communication controller | IP | ANY | 192.0.2.10 [INT] | NAPT (SNAT, 192.168.1.11 [BRI_A]) NAPT (DNAT, 192.168.1.10 [MFP]) mod_mac (R_A) Output (Fourth transceiver) |
| 7 | Fourth transceiver | IP | MAC: 00-00-5E-00-53-22 | 172 16.10.11 [SV_B1] | NAPT (SNAT, 192.0.2.200 [INT_SV_B1]) NAPT (DNAT, 192.0.2.12 [INT_B]) mod_mac (R_A) Output (First transceiver) |
| 8 | Fourth transceiver | IP | MAC: 00-00-5E-00-53-22 | 10.0.10.11 [SV_C1] | NAPT (SNAT, 192.0.2.201 [INT_SV_C1]) NAPT (DNAT, 192.0.2.13 [INT_C]) mod_mac (R_A) Output (Second transceiver) |
| 9 | Fourth transceiver | ANY | ANY | ANY | Output (First transceiver) |
| Default | ANY | ANY | ANY | ANY | Drop |

In the flow table of the bridge communication controller 15, a rule of processing packets for the bridge communication controller 15 is described. The bridge communication controller 15 detects (extracts) the rule of processing packets corresponding to the received packet information by scanning the rule of processing packets in the flow table sequentially from the top using the received packet information. Subsequently, the bridge communication controller 15 performs an operation (an action) corresponding to the received packet information indicated by the detected rule of processing packets. After performing the action, the bridge communication controller 15 finishes scanning the flow table.

As illustrated in Table 6, the rule of processing packets in the flow table includes conditions such as an input source (In port), type, source (src), destination (dst), and operation (action). If the received packet information corresponds to the all conditions described above, the bridge communication controller 15 detects the rule of processing packets corresponding to the received packet information. The condition "ANY" in Table 6 indicates that any packet information corresponds. If the received packet information does not correspond to any condition, the bridge communication controller 15 performs a default operation described in the bottom row in Table 6.

The condition "input source (in port)" in Table 6 indicates the port that receives that packet information. More specifically, the first transceiver 11, the fourth transceiver 14, the first NAPT communication controller 16, and the second NAPT communication controller 17 etc. described above correspond to the "input source (in port)". In Table 6, the condition "type" indicates a type of communication. More specifically, communication in data link layer and communication in network layer correspond to the condition. If the packet information is transferred using IP communication, the condition "type" corresponds to IP.

In Table 6, the condition "src (source)" indicates a source address. In addition, the condition "dst (destination)" indicates a destination address. More specifically, there are three cases, one IP address, network address, and MAC address regarding data link layer. By regarding MAC address as the condition of matching operation, it is possible to handle packet information from a specific apparatus as a target of NAPT operation, and it is possible to prevent inconvenience that packets are transferred from an unintended apparatus to the server apparatus SV_B1 or the server apparatus SV_C1. It should be noted that it is unnecessary that MAC address corresponds to the condition of matching operation.

In Table 6, "actions" indicates an operation when the packet information corresponds to each condition. It should be noted that the bridge communication controller 15 may perform multiple actions. Among the actions, "drop" indicates an operation that discards packet information. In addition, "NAPT" indicates that NAPT operation is performed. In case of detecting Source Network Address Translation (SNAT) as the first parameter of the packet information, the bridge communication controller 15 converts the source address (i.e., SNAT operation) as NAPT operation. In case of detecting Destination Network Address Translation (DNAT) as the first parameter of the packet information, the bridge communication controller 15 converts the destination address (i.e., DNAT operation) as NAPT operation. In each case, the second parameter corresponds to IP address to be replaced.

In performing NAPT operation described above, the bridge communication controller 15 overwrites the content of NAPT table so that NAPT operation may be performed correctly. In this case, the bridge communication controller 15 checks inappropriate TCP sessions and prevent inappropriate packets from being transferred.

Next, in Table 6, the action "mod_mac" indicates an operation of replacing MAC address. In Table 6, the action "output" indicates an operation of outputting packet information to a designated port. Here, a default operation of the bridge communication controller 15 is to discard (drop) all packet information.

In Table 6, as described using "1" and "2", if the source corresponds to IP address "192.0.2.0/24" used within the communication control box 2, the bridge communication controller 15 discards (drops) packet information. As a result, it is possible to prevent inconvenience that packet information whose IP address is used within the communication control box 2 is received from outside and unintended packet information is transferred.

In Table 6, as described using "3", the source corresponding to IP address "192.168.100.0/24" indicates IP address whose access is not allowed. By contrast, in Table 6, as described using "4", the source corresponding to IP address "192.168.0.0/16" indicates IP address whose access is allowed. In consideration of security policy, an access control list including IP address whose access is not allowed and IP address whose access is allowed is configured by user operation. The bridge communication controller 15 discards (drops) packet information whose source IP address corresponds to "192.168.100.0/24" and transfers (outputs) packet information whose source IP address corresponds to "192.168.0.0/16" to the fourth transceiver 14.

In Table 6, as described using "4", if packet information whose IP address is "192.168.0.0/16" is received from the first transceiver 11, the bridge communication controller 15 transfers the packet information to the fourth transceiver 14. In Table 6, as described using "9", an operation that the bridge communication controller 15 transfers any (i.e., "ANY") packet information received from the fourth transceiver 14 to the first transceiver 11. Basically, the bridge communication controller 15 enables communication between the first transceiver 11 and the fourth transceiver 14. For example, except a part of packet information such as packet information regarding internal communication, the first NAPT communication controller 16, and the second NAPT communication controller 17, the communication control box 2 performs bridge operation.

In Table 6, as described using "5", packet information received via the first NAPT communication controller 16 is described. If the destination is IP address "192.0.2.10 (INT)" of the bridge communication controller 15, the bridge communication controller 15 sets IP address BRI_A of the bridge communication controller 15 to the source address, sets the MFP to the destination address, sets MAC address of the router R_A to the source MAC address, and transfers the packet information to the fourth transceiver 14.

In Table 6, as described using "6", packet information received via the second NAPT communication controller 17 is described. If the destination is IP address "192.0.2.10 (INT)" of the bridge communication controller 15, the bridge communication controller 15 sets IP address BRI_A of the bridge communication controller 15 to the source address, sets the MFP to the destination address, sets MAC address of the router R_A to the MAC address, and transfers the packet information to the fourth transceiver 14.

In Table 6, as described using "7", if the packet information received via the fourth transceiver 14 (e.g., packet information generated by scanning a document) includes MAC address of the MFP 1 and the destination of the packet information corresponds to the server apparatus SV_B1, the bridge communication controller 15 performs NAPT operation to convert the source to IP address of INT_SV_B1 in the server apparatus and convert the destination to IP address of INT_B in the first NAPT communication controller 16 and transfers the packet information to the first NAPT communication controller 16.

In Table 6, as described using "8", if the packet information received via the fourth transceiver 14 (e.g., packet information generated by scanning a document) includes MAC address of the MFP 1 and the destination of the packet information corresponds to the server apparatus SV_C1, the bridge communication controller 15 performs NAPT operation to convert the source to IP address of INT_SV_C1 in the server apparatus and convert the destination to IP address of INT_C in the second NAPT communication controller 17 and transfers the packet information to the second NAPT communication controller 17.

Here, an order of the rule of processing packet in the flow table in Table 6 is determined in consideration of security, possibility of accordance, and operability of control for example. For example, in the network communication system in this embodiment, it is assumed that communication between the first transceiver 11 and the fourth transceiver 14 is performed most frequently. In this case, as the rule of processing packet scanned firstly on the flow table in Table 6, the rule of processing packet corresponding to communication between the first transceiver 11 and the fourth transceiver 14 is configured. In this example, the rule of processing packet whose possibility of accordance is higher is laid out sequentially from the top and scanned. As described above, in case of scanning the rule of processing packet sequentially from the rule of processing packet whose possibility of accordance is higher, it is possible to detect the corresponding rule of processing packet at higher speed.

Next, Table 7 described below describes the flow table stored in the communication routing control information storing unit 33 included in the first NAPT communication controller 16.

TABLE 7

| | In port | Type | Source (src) | Destination (dst) | Action |
|---|---|---|---|---|---|
| 1 | Second transceiver | IP | 192.0.2.0/24 | ANY | Drop |
| 2 | Second transceiver | IP | 172.16.0.0/16 | 172.16.1.10:161 [MFP_B] | NAPT (SNAT, 192.0.2.12 [INT_B]) NAPT (DNAT, 192.0.2.10:161 [INT]) Output (Bridge communication controller) |
| 3 | Second transceiver | IP | 172.16.0.0/16 | 172.16.1.10:9100 [MFP_B] | NAPT (SNAT, 192.0.2.12 [INT_B]) NAPT (DNAT, 192.0.2.10:9100 [INT]) Output (Bridge communication controller) |
| 4 | Bridge communication controller | IP | 192.0.2.200 [INT_SV_B1] | 192.0.2.12:445 [INT_B] | NAPT (SNAT, 172.16.1.10 [MFP_B]) NAPT (DNAT, 172.16.10.11 [SV_B1]) Output (Second transceiver) |
| Default | ANY | ANY | ANY | ANY | Drop |

In the flow table of the first API communication controller 16, the rule of processing packet for the first NAPT communication controller 16 is described. Just like the bridge communication controller 15 as described above, the first NAPT communication controller 16 detects the rule of processing packets corresponding to the received packet information by scanning the rule of processing packets in the flow table sequentially from the top using the received packet information. Subsequently, the bridge communication controller 15 performs an operation (an action) corresponding to the received packet information indicated by the detected rule of processing packets. After performing the action, the first NAPT communication controller 16 finishes scanning the flow table.

More specifically, in Table 7, as described using "default", the operation indicates that the first NAPT communication controller 16 discards (drops) unintended packet information. In Table 7, as described using "2" and "3", the first NAPT communication controller 16 performs NAPT operation on packet information for Simple Network Management Protocol (SNMP) communication and printing using the printer received from the network group Net_B and transfers the packet information to the bridge communication controller 15. In this case, the first NAPT communication controller 16 restricts source IP address using the access control setting. However, it is unnecessary that the first NAPT communication controller 16 does not restrict the source IP address.

In Table 7, as described using "4", if packet information whose destination is the first NAPT communication controller 16 is received from the server apparatus SV_B1 in the network group Net_B via the bridge communication controller 15, for example, the first NAPT communication controller 16 performs NAPT operation so that the MFP 1 transfers scanned filed information to the server apparatus SV_B1 and transfers the packet information to the second transceiver 12.

In performing NAPT operation, the first NAPT communication controller 16 detects a status of a Transmission Control Protocol (TCP) session and does not accept packets whose status is in the middle of the TCP session regarding the session that has not started yet. If the TCP session has not started yet, by accepting handshake for establishing the TCP session, the first NAPT communication controller 16 prevents unintended packet such as attack from being transferred.

Next, Table 8 described below describes the flow table stored in the communication routing control information storing unit 37 included in the second NAPT communication controller 17.

using "2" and "3", the second NAPT communication controller 17 performs NAPT operation on packet information for SNMP communication and printing using the printer received from the network group Net_C and transfers the packet information to the bridge communication controller 15. In this case, the second NAPT communication controller 17 restricts source IP address using the access control setting. However, it is unnecessary that the first NAPT communication controller 16 does not restrict the source IP address.

In Table 8, as described using "4", if packet information whose destination is the second NAPT communication controller 17 is received from the server apparatus SV_C1 in the network group Net_C via the bridge communication controller 15, for example, the second NAPT communication controller 17 performs NAPT operation so that the MFP

TABLE 8

| | In port | Type | Source (src) | Destination (dst) | Action |
|---|---|---|---|---|---|
| 1 | Third transceiver | IP | 192.0.2.0/24 | ANY | Drop |
| 2 | Third transceiver | IP | ANY | 10.0.1.10:161 [MFP_C] | NAPT (SNAT, 192.0.2.12 [INT_C]) NAPT (DNAT, 192.0.2.10:161 [INT]) Output (Bridge communication controller) |
| 3 | Third transceiver | IP | ANY | 10.0.1.10:9100 [MFP_C] | NAPT (SNAT, 192.0.2.12 [INT_C]) NAPT (DNAT, 192.0.2.10:9100 [INT]) Output (Bridge communication controller) |
| 4 | Bridge communication controller | IP | 192.0.2.201 [INT_SV_C1] | 192.0.2.13:445 [INT_C] | NAPT (SNAT, 10.0.1.10 [MFP_C]) NAPT (DNAT, 10.0.10.11 [SV_C1]) Output (Second transceiver) |
| Default | ANY | ANY | ANY | ANY | Drop |

In the flow table of the second NAPT communication controller 17, the rule of processing packet for the second NAPT communication controller 17 is described. Just like the bridge communication controller 15 as described above, the second NAPT communication controller 17 detects the rule of processing packets corresponding to the received packet information by scanning the rule of processing packets in the flow table sequentially from the top using the received packet information. Subsequently, the bridge communication controller 15 performs an operation (an action) corresponding to the received packet information indicated by the detected rule of processing packets. After performing the action, the second NAPT communication controller 17 finishes scanning the flow table.

More specifically, in Table 8, as described using "default", the operation indicates that the second NAPT communication controller 17 discards (drops) internal communication or unintended packet information. In Table 8, as described 1 transfers scanned filed information to the server apparatus SV_C1 and transfers the packet information to the second transceiver 12.

In performing NAPT operation, the second NAPT communication controller 17 detects a status of a TCP session and does not accept packets whose status is in the middle of the TCP session regarding the session that has not started yet. If the TCP session has not started yet, by accepting handshake for establishing the TCP session, the second NAPT communication controller 17 prevents unintended packet such as attack from being transferred.

Figure 9:
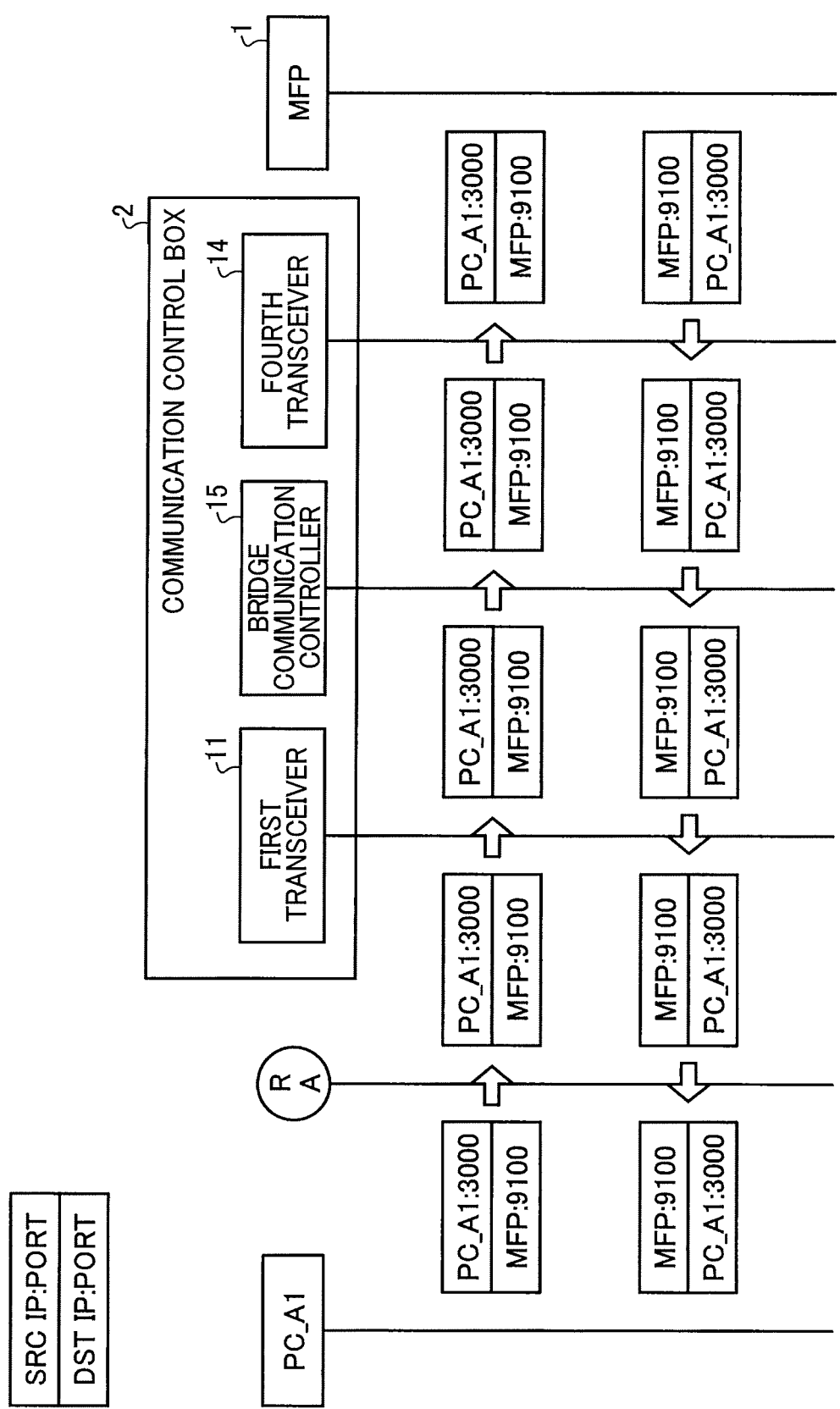
FIG. 9 is a sequence chart illustrating a flow of a packet from a personal computer (PC) to a multifunction peripheral (MFP) in printing by the network communication system as an embodiment of the present invention.

FIG. 9 is a sequence chart illustrating a flow of packet information from a PC located in the network group Net_A in FIG. 1 to the MFP 1 in printing data using the MFP 1 in this embodiment. In FIG. 9, packet information "PC_A1: 3000" indicates IP address and a port number of the PC PC_A1 as the source (SRC). That is, "PC_A1" indicates IP address of the PC PC_A1, and "3000" indicates the port number. Similarly, in packet information "MFP:9100", "MFP" indicates IP address of the MFP 1 as the destination (DST), and "9100" indicates the port number.

If the PC PC_A1 located in the network group Net_A transfers packet information to the MFP 1, as illustrated in FIGS. 2 and 9, the packet information is transferred via the bridge communication controller 15 in the communication control box 2. Therefore, as illustrated in FIG. 9, instead of performing NAPT operation etc., the packet information is transferred in the order of the PC PC_A1, the router R_A, the first transceiver 11, the bridge communication controller 15, the fourth transceiver 14, and the MFP 1.

Similarly, if the MFP 1 transfers packet information to the PC PC_A1, the packet information is transferred via the bridge communication controller 15 in the communication control box 2. Therefore, as illustrated in FIG. 9, the packet information whose source (SRC) is "MFP:9100" and destination (DST) is "PC_A1:3000" is transferred in the order of the MFP 1, the fourth transceiver 14, the bridge communication controller 15, the first transceiver 11, the router R_A in the network group Net_A, and the PC PC_A1. From the viewpoint of packet, the source port of a terminal as a client is modified in accordance with an upper layer such as session layer and application layer etc.

Figure 10:
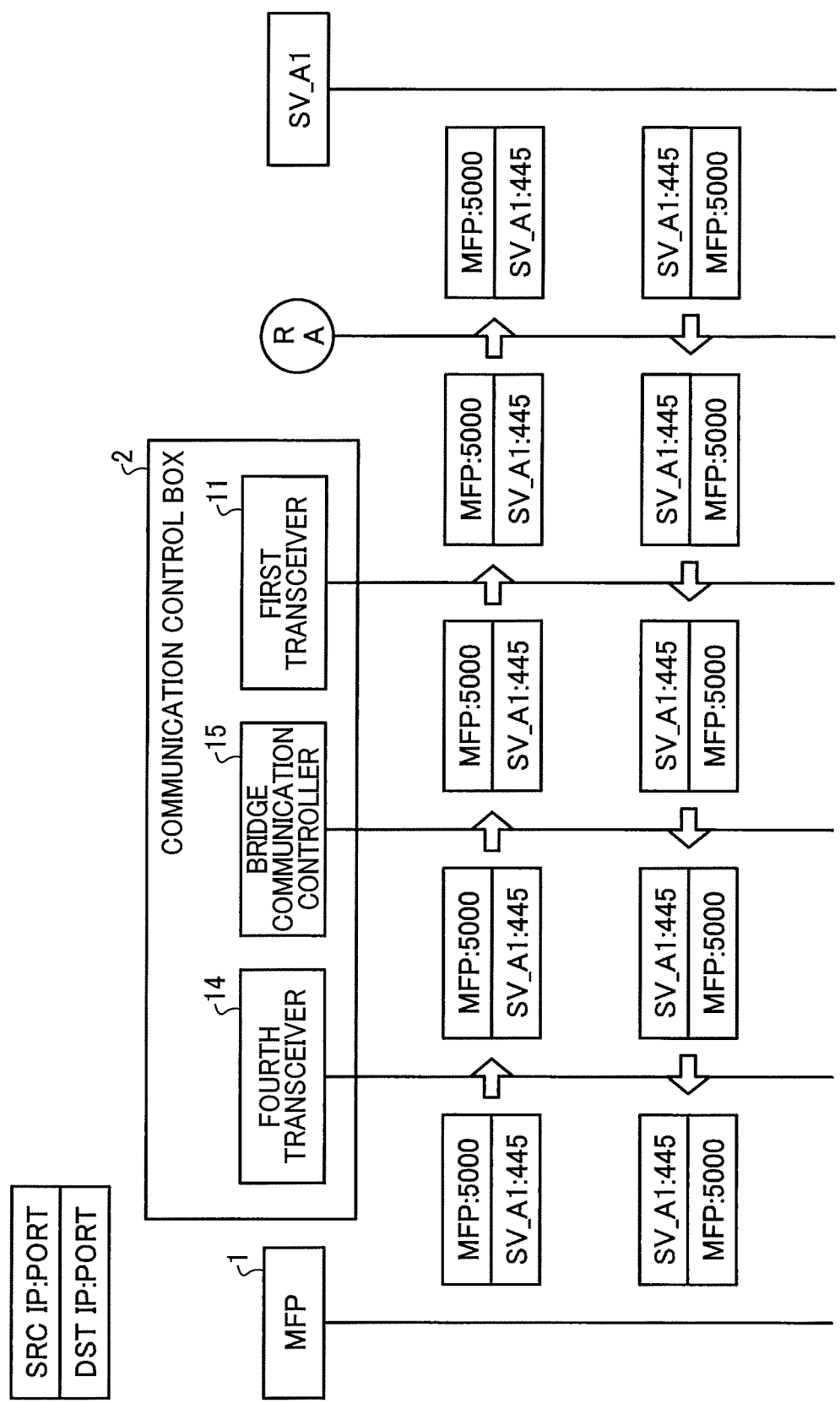
FIG. 10 is a sequence chart illustrating a flow of a packet from the MFP to a server apparatus in transferring a file by the network communication system as an embodiment of the present invention.

FIG. 10 is a sequence chart illustrating a flow of file information from the MFP 1 to the server apparatus SV_A1 located in the network group Net_A illustrated in FIG. 1 in this embodiment. As described above, in FIG. 10, file information "MFP:5000" indicates IP address and a port number of the MFP 1 as the source (SRC). Similarly, file information "SV_A1:445" indicates IP address and port number of the server apparatus SV_A1 as the destination (DST).

If the MFP 1 transfers file information to the server apparatus SV_A1 located in the network group Net_A, as illustrated in FIGS. 2 and 10, the file information is transferred via the bridge communication controller 15 in the communication control box 2. Therefore, as illustrated in FIG. 10, instead of performing NAPT operation etc., the file information is transferred in the order of the MFP 1, the fourth transceiver 14, the bridge communication controller 15, the first transceiver 11, the router R_A, and the server apparatus SV_A1.

Similarly, if the server apparatus SV_A1 transfers file information to the MFP 1, the file information is transferred via the bridge communication controller 15 in the communication control box 2. Therefore, as illustrated in FIG. 10, the file information whose source "SRC" is "SV_A1:445" and destination (DST) is "MFP:5000" is transferred in the order of the server apparatus SV_A1, the router R_A, the first transceiver 11, the bridge communication controller 15, the fourth transceiver 14, and the MFP 1. From the viewpoint of packet, the source port of a terminal as a client is modified in accordance with an upper layer such as session layer and application layer etc.

That is, as illustrated in the sequence charts in FIGS. 9 and 10, the file information is transferred from/to the network group Net_A instead of performing conversion by performing NAPT operation.

Figure 11:
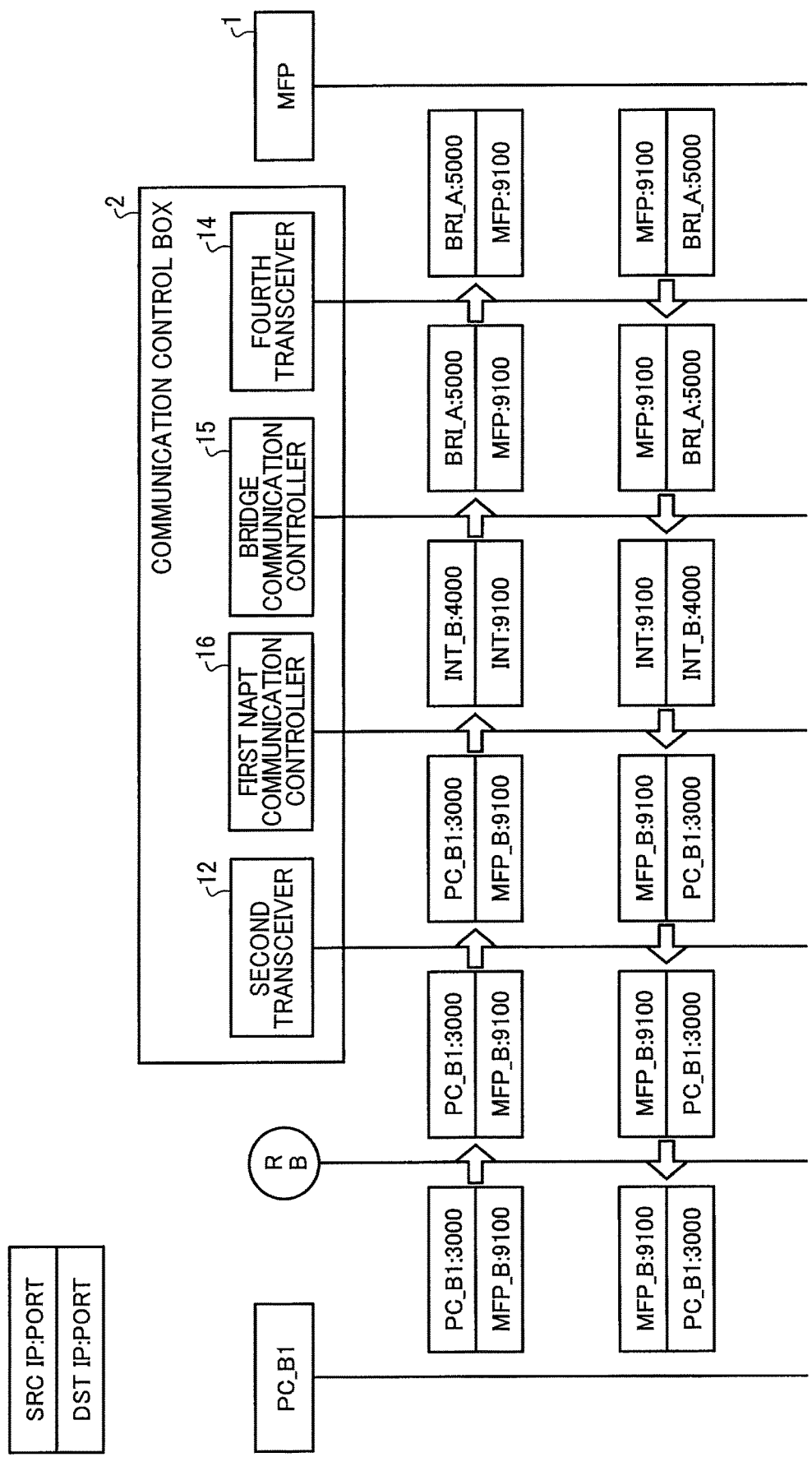
FIG. 11 is a sequence chart illustrating a flow of a packet from the PC to the MFP in printing by the network communication system as an embodiment of the present invention.

FIG. 11 is a sequence chart illustrating a flow of packet information from the PC PC_B1 located in the network group Net_B in FIG. 1 to the MFP 1 in printing data using the MFP 1 in this embodiment. In FIG. 11, packet information "PC_B1:3000" indicates IP address and a port number of the PC PC_B1 as the source (SRC). Similarly, as described above, packet information "MFPB:9100" indicates IP address and port number of the MFP 1 as the destination (DST). As described before using Table 3, "MFPB" indicates IP address for accessing the MFP 1 from the network group Net_B.

If the PC PC_B1 located in the network group Net_B transfers packet information to the MFP 1, as illustrated in FIGS. 2 and 11, the packet information is transferred via the first NAPT communication controller 16 and the bridge communication controller 15 in the communication control box 2. Therefore, as illustrated in FIG. 11, the packet information is transferred in the order of the PC PC_B1, the router R_B, the second transceiver 12, the first NAPT communication controller 16, the bridge communication controller 15, the fourth transceiver 14, and the MFP 1.

Just like the operation of "3" in Table 7 described before, in transferring packet information to the bridge communication controller 15, the first NAPT communication controller 16 performs NAPT operation on packet information whose source is "PC_B1:3000" and destination is "MFPB:9100" so that the source is set to "INT_B:4000" and the destination is set to "INT:9100" using the flow table for the first NAPT communication controller 16 and transfers the packet information to the bridge communication controller 15.

Here, the reason why the source IP address is converted into "INT_B" is to distinguish packet information returned to the source from IP address INT_C of the second NAPT communication controller 17. (That is, the packet information from IP address INT_B returns to IP address INT_B, and the packet information from IP address INT_C returns to IP address INT_C.) Just like the operation of "5" in Table 6 described before, in transferring packet information to the fourth transceiver 14, the bridge communication controller 15 performs NAPT operation on packet information whose source is "INT_B:4000" and destination is "INT:9100" so that the source is set to "BRI_A:5000" and the destination is set to "MFP:9100" using the flow table for the bridge communication controller 15 and transfers the packet information to the fourth transceiver 14. As a result, the packet information from the PC PC_B1 located in the network group Net_B is transferred to the MFP 1.

By performing NAPT operation so that IP address "INT_B:4000" used within the communication control box 2 is converted into IP address "BRI_A:5000" that can be used outside the communication control box 2, it is possible to prevent inconvenience that IP address such as "INT_B" etc. used within the communication control box 2 from being used externally.

In addition, the bridge communication controller 15 converts the source MAC address into MAC address of the router R_A located in the network group Net_A. As a result, the MFP 1 recognizes that packet information is transferred from the router R_A as the default gateway. Consequently, it is possible to handle the network as if the PC PC_B1 in the network group Net_B would be located ahead of the router R_A.

By contrast, if the MFP 1 transfers packet information to the PC PC_B1 located in the network group Net_B, as illustrated in FIGS. 2 and 11, the packet information is transferred via the bridge communication controller 15 and the first NAPT communication controller 16 in the communication control box 2. Therefore, as illustrated in FIG. 11, the packet information is transferred in the order of the MFP 1, the fourth transceiver 14, the bridge communication controller 15, the first NAPT communication controller 16, the second transceiver 12, the router R_B, and the PC PC_B1.

Just like the operation of "7" in Table 6 described before, in transferring packet information to the first NAPT communication controller 16, the bridge communication controller 15 performs NAPT operation on packet information whose source is "MFP:9100" and destination is "BRI_A:5000" so that the source is set to "INT:9100" and the destination is set to "INT_B:4000" using the flow table for the bridge communication controller 15 and transfers the packet information to the first NAPT communication controller 16.

Just like the operation of "4" in Table 7 described before, in transferring packet information to the second transceiver 12, the first NAPT communication controller 16 performs NAPT operation on packet information whose source is "INT:9100" and destination is "INT_B:4000" so that the source is set to "MFP_B:9100" and the destination is set to "PC_B1:3000" using the flow table for the first NAPT communication controller 16 and transfers the packet information to the second transceiver 12. As a result, the packet information from the MFP 1 is transferred to the PC PC_B1 located in the network group Net_B.

Figure 12:
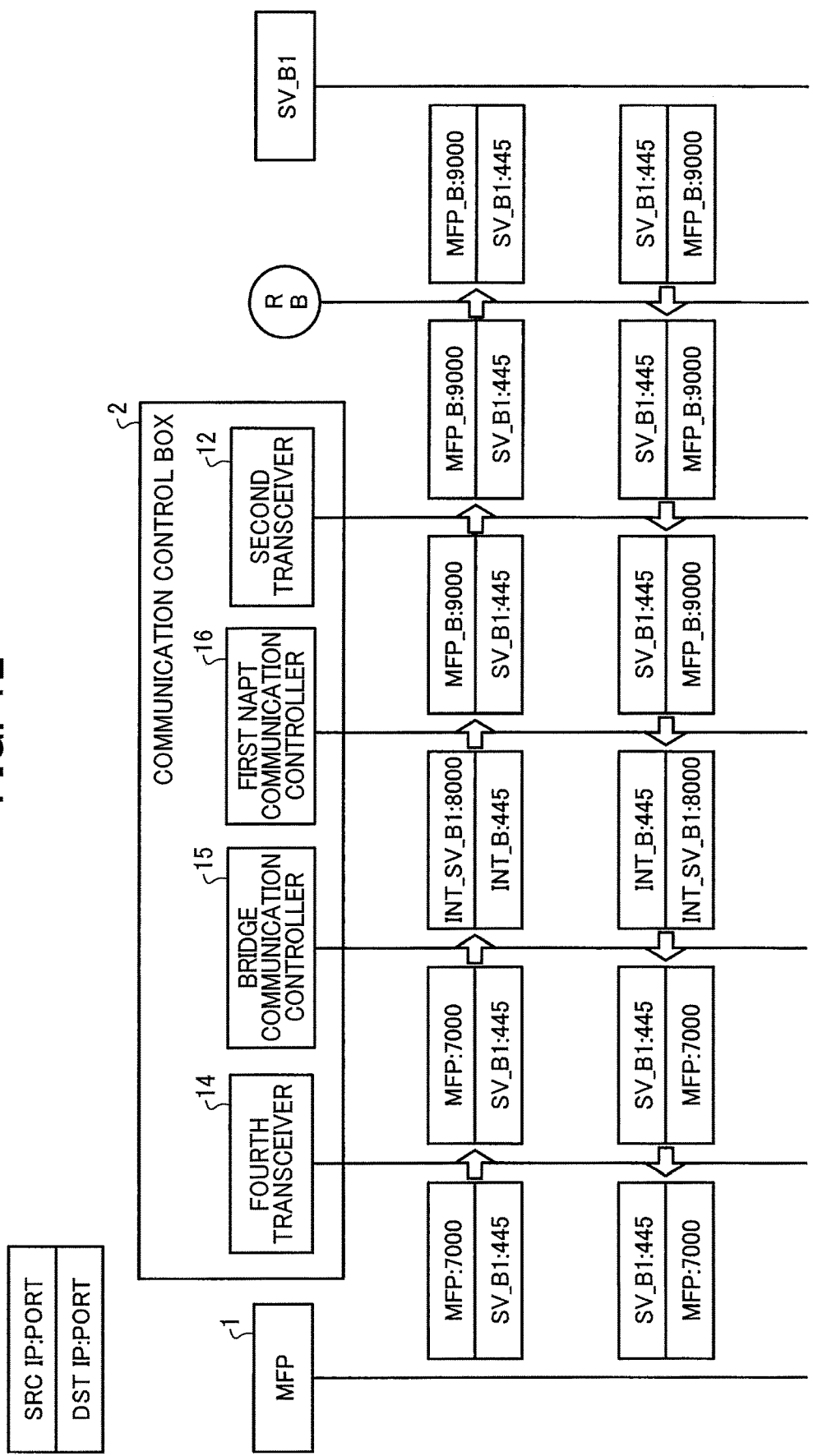
FIG. 12 is a sequence chart illustrating a flow of a packet from the MFP to a server apparatus in transferring a file by the network communication system as an embodiment of the present invention.

FIG. 12 is a sequence chart illustrating a flow of file information from the MFP 1 to the server apparatus SV_B1 located in the network group Net_B illustrated in FIG. 1 in this embodiment. As described above, in FIG. 12, file information "MFP:7000" indicates IP address and a port number of the MFP 1 as the source (SRC). Similarly, file information "SV_B1:445" indicates IP address and port number of the server apparatus SV_B1 as the destination (DST).

If the MFP 1 transfers file information to the server apparatus SV_B1 located in the network group Net_B, as illustrated in FIGS. 2 and 12, the file information is transferred via the bridge communication controller 15 and the first NAPT communication controller 16 in the communication control box 2. Therefore, as illustrated in FIG. 12, the file information is transferred in the order of the MFP 1, the fourth transceiver 14, the bridge communication controller 15, the first NAPT communication controller 16, the second transceiver 12, the router R_B, and the server apparatus SV_B1.

Just like the operation of "7" in Table 6 described before, in transferring file information to the first NAPT communication controller 16, the bridge communication controller 15 performs NAPT operation on file information from the fourth transceiver 14 whose source is "MFP:7000" and destination is "SV_B1:445" so that the source is set to "INT_SV_B1:8000" and the destination is set to "INT_B:445" using the flow table for the bridge communication controller 15 and transfers the file information to the first NAPT communication controller 16. As a result, IP address of the file information is converted into IP address used within the communication control box 2.

In transferring the file information to the second transceiver 12, the first NAPT communication controller 16 converts IP addresses "INT_SV_B1:8000" and "INT_B:445" used inside the communication control box 2 into IP addresses "MFP_B:9000" and "SV_B1:445" used outside the communication control box 2 and transfers the file information to the second transceiver 12. The file information whose IP addresses are "MFP_B:9000" and "SV_B1:445" is transferred from the second transceiver 12 to the server apparatus SV_B1 in the network group Net_B via the router R_B located in the network group Net_B.

The first NAPT communication controller 16 performs NAPT operation to change the source IP address "INT_SV_B1:8000" into "MFP_B" and change the destination IP address "INT_B:445" into "SV_B1:445". As a result, the server apparatus SV_B1 in the network group Net_B recognizes the file information as if the file information would be transferred from the MFP_B in the network group Net_B.

By performing NAPT operation so that IP addresses "INT_SV_B:8000" and "INT_B:445" used within the communication control box 2 is converted into IP addresses "MFP_B:9000" and "SV_B1:445", it is possible to prevent inconvenience that IP address such as "INT_SV_B1:8000" etc. used within the communication control box 2 from being used externally.

If the server apparatus SV_B1 located in the network group Net_B transfers file information to the MFP 1, as illustrated in FIGS. 2 and 12, the file information is transferred in the order of the server apparatus SV_B, the router R_B, the second transceiver 12, the first NAPT communication controller 16, the bridge communication controller 15, the fourth transceiver 14, and the MFP 1.

In transferring the file information to the bridge communication controller 15, the first NAPT communication controller 16 performs NAPT operation to convert the source IP address "SV_B1:445" and the destination IP address "MFP_B:9000" into IP addresses "INT_B:445" and "INT_SV_B1:8000" used inside the communication control box 2 respectively.

In addition, in transferring the file information to the fourth transceiver 14, the bridge communication controller 15 performs NAPT operation to convert IP addresses "INT_B:445" and "INT_SV_B1:8000" performed NAPT operation to be used inside the communication control box 2 into IP addresses "SV_B1:445" and "MFP:7000" used outside the communication control box 2. As a result, the file information whose IP address is used outside the communication control box 2 is transferred to the MFP1 via the fourth transceiver 14.

As described above, the network communication system in this embodiment is connected to multiple networks separated so that communication is not performed with each other and includes the communication control box 2 that controls communication between apparatuses such as the server apparatus and the PC etc. located in each network and the MFP 1. The communication control box 2 includes communication controllers such as the bridge communication controller 15, the first NAPT communication controller 16, and the second NAPT communication controller 17 etc. that control communication with the MFP 1 for each network. Each communication controller includes information processing table (with reference to Tables 6 to 8) dedicated to each communication controller for determining the way transmission-and-reception information is processed. In the information processing table, import interfaces that transmission-and-reception information is imported such as the first transceiver 11, the fourth transceiver 14, the bridge communication controller 15, and the first NAPT communication controller 16 etc., source IP address and destination IP address of the transmission-and-reception information received by each import interface, and operation performed on the transmission-and-reception information are stored associated with each other.

Each communication controller refers to the information processing table in the basis of MAC address, import interface, source IP address, and destination IP address corresponding to the received transmission-and-reception information and performs an operation corresponding to the received transmission-and-reception information. As a result, it is possible to control communication between the MFP 1 and apparatuses in the network for each network, and it is possible to perform communication between networks beyond the router for each network. Consequently, the network communication system in this embodiment may be used with a large-scale network.

Since the dedicated information processing table is located for the communication controller in each network respectively, it is possible to modify the operation for transmission-and-reception information using a predetermined information processing rule, and it is possible to control transmission-and-reception information circumstantially.

In performing NAPT operation, for example, restriction that it is difficult to use normal discovery protocol occurs. However, in the network communication system in this embodiment, the communication controller such as the bridge communication controller 15 etc. may determine whether to convert IP address of the transmission-and-reception information (network address) and transfer the transmission-and-reception information or to transfer the transmission-and-reception information instead of the conversion. As a result, regarding the transmission-and-reception information unnecessary to convert the network address, it is possible to transfer the transmission-and-reception information directly without converting the network address. Consequently, while a part of communication is restricted by performing NAPT operation, communication determined that NAPT operation is not performed is free from the restriction of NAPT operation. In addition, it is unnecessary to modify settings of the communication control box 2 etc. for example.

Since it is possible to control communication in the basis of the source and destination of the transmission-and-reception information, it is possible to control communication using predetermined security policy.

By using port numbers of the transmission-and-reception information such as 80/tcp etc. for controlling communication, since it is possible to control communication using communication protocol, it is possible to control communication using predetermined security policy.

IP address of apparatuses in each network etc. may be configured via a setting screen by user operation. Therefore, it is possible to control communication surely depending on a connection status of the network.

Among routing tables in the bridge communication controller 15, the first NAPT communication controller 16, and the second NAPT communication controller 17, at least one routing table (IP address, netmask, and router address etc.) is configured based on the information provided by the external server apparatus (DHCP). As a result, since it is possible to control the routing tables en bloc, it is possible to operate the communication control box easily.

It is determined whether or not NAPT operation (network address converting operation) is performed in the bridge communication controller 15, the first NAPT communication controller 16, and the second NAPT communication controller 17 in the basis of the condition of the network session. As a result, for example, if unintended communication is started, it is possible to disconnect the communication channel, and it is possible to enhance security of the network communication system in this embodiment.

It is determined whether or not NAPT operation (network address converting operation) is performed in the bridge communication controller 15, the first NAPT communication controller 16, and the second NAPT communication controller 17 in the basis of MAC address of the apparatus as the source. As a result, it is possible to disconnect the communication channel instead of performing network address conversion from the unintended apparatus, and it is possible to enhance security of the network communication system in this embodiment.

The bridge communication controller 15 may control access in the network group Net_A on the bridge side (network group Net_A side). By contrast, In the network groups Net_B and Net_C, the first NAPT communication controller 16 or the second NAPT communication controller 17 performs NAPT operation. Therefore, even in case of setting an access control rule, it is difficult to control the range of controlling access. That is, since IP address is converted, it is difficult to perform control using the source IP address. However, by performing access restriction in accordance with the configured access control rule, even in the network groups Net_B and Net_C (NAPT side), it is possible to perform access restriction in the basis of the address before converting address.

Second Embodiment

In the network communication system in the first embodiment described above, the MFP 1 is implemented as the apparatus physically separated from the communication control box 2. However, in the network communication system in this embodiment, for example, the communication control box 2 is integrated with the MFP 1 such as an expansion board etc. In addition, in the network communication system in this embodiment, application (such as scan application and copy application etc. running on the MFP 1) usage information and log information are recorded in units of each transceiver (i.e., in units of each network interface). It should be noted that only that configuration is different between the first embodiment described before and the second embodiment described below. Therefore, first, only the different configuration is described below, and the redundant descriptions are omitted.

Figure 13:
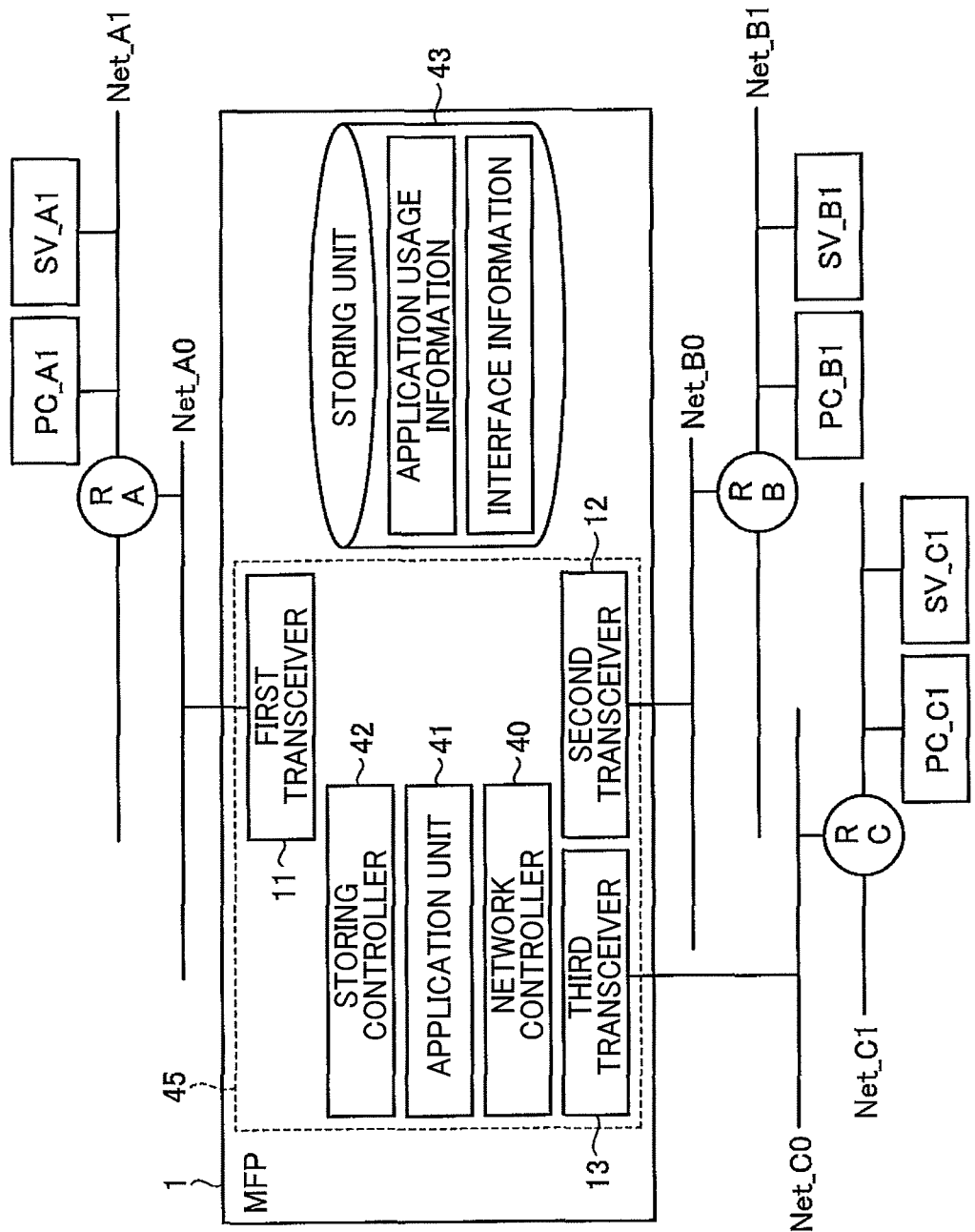
FIG. 13 is a diagram illustrating a configuration of a network communication system as an embodiment of the present invention.

FIG. 13 is a block diagram illustrating a substantial part of the MFP located in the network communication system in this embodiment. In this embodiment, a communication control unit 45 corresponding to the communication control box 2 described before is included in the MFP 1. In this embodiment, the communication control unit 45 is located inside the MFP 1. Therefore, the fourth transceiver 14 illustrated in the communication control box 2 in the first embodiment described before is not illustrated in FIG. 13 used for the description in this embodiment. In the MFP 1 in this embodiment, the communication control unit 45 is connected to the main unit of the MFP 1 electrically and physically via an interface corresponding to the fourth transceiver 14. In addition, just like the communication control box 2 in the first embodiment described above, it is possible that the communication control unit 45 is externally located outside the MFP 1.

As illustrated in FIG. 13, in the MFP 1 in the network communication system in this embodiment, the communication control unit 45 corresponding to the communication control box 2 described before includes a first transceiver 11 as a communication interface for the Net_A group, a second transceiver 12 as a communication interface for the Net_B group, and a third transceiver 13 as a communication interface for the Net_C group. In addition, the communication control unit 45 includes a network controller 40, an application unit 41, and a storing controller 42. Along with the communication control unit 45 described above, the MFP 1 also includes a storing unit 43 that stores application usage information and interface information. For example, nonvolatile memories such as the ROM, RAM, HDD, and solid state drive (SSD) etc. may be used for the storing unit 43.

Communication packets received by the first transceiver 11, the second transceiver 12, and the third transceiver 13 are processed by applications such as a scan application and a copy application etc. controlled by the network controller 40 and stored in the storing unit 43. In addition, communication packets such as a scanned image and a copied image etc. generated by applications installed in the MFP 1 are transferred to a destination determined by the network controller 40 via either one of the first transceiver 11, the second transceiver 12, and the third transceiver 13.

In receiving or transferring communication packets via either one of the first transceiver 11, the second transceiver 12, and the third transceiver 13, the storing controller 42 records a source IP address/port (remote IP address/port), a destination IP address/port (local IP address/port), a protocol, a transferring/receiving interface (interface), a next hop MAC address (next hop MAC), a communication status (state), and lifetime in the storing unit 43.

A source MAC address is MAC address used when the communication packet is transmitted. Regarding the lifetime, a predetermined number of seconds is configured when the communication packet is received. The lifetime decreases when communication whose communication connection is the same is not performed. If the remaining lifetime becomes 0, it is considered that the communication ends, and the corresponding communication connection is deleted from the connection table.

As the communication status (state), in performing TCP communication, information indicating a status of TCP is stored. In performing User Datagram Protocol (UDP) communication, only information (CONNECTED) indicating that the connections is established is stored. Regarding the communication status, it is possible to record and manage more detailed information.

With reference to the connection table described above and settings for transmission (i.e., an application transmission setting table, a transport transmission setting table, a network identifier transmission setting table, and a network transmission setting table), the network controller 40 determines the destination of the communication packet.

The storing controller 42 controls storing "application usage information" and "network information" in the storing unit 43. For example, database systems such as Relational Database Management System (RDBMS) and Not only Structured Query Language (NoSQL) etc. may be used for controlling storing the "application usage information" and "network information". For example, the storing controller 42 controls storing various information such as network address, application content, date/time, and application usage status etc. in the storing unit 43. In addition, the storing controller 42 controls storing application usage information including network address set to the first transceiver 11, the second transceiver 12, and the third transceiver 13 and interface name for reporting to users etc. in the storing unit 43.

Next, as described before with reference to Table 1, in the entire system, network addresses are configured so that network addresses in each group do not overlap. It should be noted that, the network addresses may be configured so that IP address of the MFP 1 does not overlap with IP address of the server apparatus that communicates with the MFP 1 directly. Even if the IP address of the server apparatus that communicates with the MFP 1 directly overlaps, the configuration can be made so that static NAPT is set. Furthermore, in Table 1, IPv4 addresses are set. However, it is possible to set IPv6 addresses.

Table 9 describes an example of the interface information below.

TABLE 9

| Network address/netmask | Transceiver | Interface name |
|---|---|---|
| 192.268.1.10/24 | First transceiver | Network A (Net_A) |
| 172.16.1.10/24 | Second transceiver | Network B (Net_B) |
| 10.0.1.10/24 | Third transceiver | Network C (Net_C) |

As described in able 9 above, regarding the interface information, network addresses set to each of the first transceiver 11, the second transceiver 12, and the third transceiver 13 and interface name displayed for users are stored associated with each other. For example, regarding the first transceiver 11, network address and netmask "192.168.1.10/24" is stored associated with the interface name "network A (Net_A group)". Similarly, regarding the third transceiver 13, network address and netmask "10.0.1.10/24" is stored associated with the interface name "network C (Net_C group)". It should be noted that it is possible to change the interface name into an arbitrary name.

Table 10 described an example of the application usage information below.

TABLE 10

| ID | Interface Name | Network address | Application name | Start/End date and time | Status |
|---|---|---|---|---|---|
| 1 | First transceiver | 192.268.10.100/24 | Print | 2017 Mar. 29 09:21-09:21 | Finished |
| 2 | Second transceiver | 172.16.10.11/24 | Scan | 2017 Mar. 29 09:23-09:25 | Failed |
| 3 | Third transceiver | 10.0.10.100/24 | Print | 2017 Mar. 29 15:00-15:01 | Finished |

As described in Table 10, regarding the application usage information, identification information (ID), interface name, network address, application name, information indicating start date/time, finish date/time, and status are stored associated with each other. It should be noted that it is possible that information other than items described above is stored in the storing unit 43 as the application usage information. In addition, the identification information (ID) may be omitted.

In Table 10, information such as "first transceiver", "192.168.10.100/24", "print", "2017/03/29 09:21-09:21", and "finished" are associated with the identification information "1". The information described above indicates that "the first transceiver" whose network address is "192.168.10.100/24" is used by the "print" application from 09:21 to 09:21 on Mar. 29, 2017 and the print job "finished".

Similarly, in Table 10, information such as "second transceiver", "172.16.10.11/24", "scan", "2017/03/29 09:23-09:25", and "failed" are associated with the identification information "2". The information described above indicates that "the second transceiver" whose network address is "172.16.10.11/24" is used by the "scan" application from 09:23 to 09:25 on Mar. 29, 2017 and it is "failed" to scan images etc. by scanning.

Figure 14:
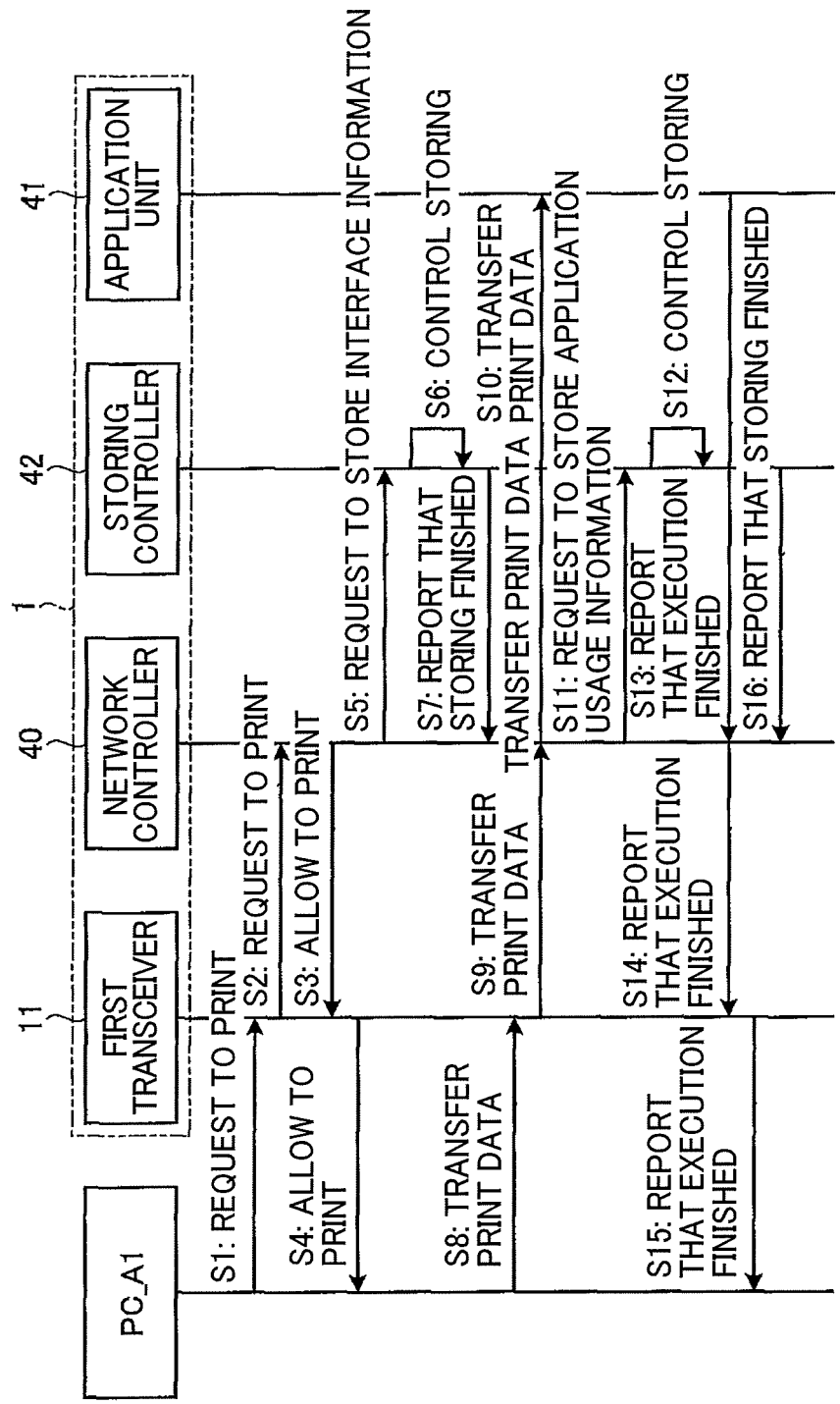
FIG. 14 is a flowchart illustrating an operation of recording application usage information and log information in units of a network interface as an embodiment of the present invention.

As described above, in the network communication system in this embodiment, application (such as scan application and copy application etc.) usage information and log information are recorded in units of each network interface. FIG. 14 is a flowchart illustrating an operation of recording application usage information and log information in units of a network interface in this embodiment. In FIG. 14, application usage information and log information corresponding to a request for printing received from the PC PC_A1 connected to the network A (Net_A group) illustrated in FIG. 13 are stored.

In the flowchart in FIG. 14, a request for printing transferred by the PC PC_A1 is received by the first transceiver 11 in the MFP 1 in S1. The first transceiver 11 transfers the received request for printing to the network controller 40 in the communication control unit 45 in S2. If the PC PC_A1 is owned by a user who is allowed to perform printing, the network controller 40 transfers a notification of allowing printing to the PC PC_A1 via the first transceiver 11 in S3 and S4.

In addition, after transferring the notification of allowing printing described above, the network controller 40 requests the storing controller 42 to store interface information corresponding to the first transceiver 11 in S5. As described before with reference to Table 9, the storing controller 42 controls storing information indicating the transceiver that received the request for printing (i.e., the first transceiver 11 in this case), interface name (i.e., the network A (Net_A) in this case), and network address/netmask (i.e., 192.168.1.10/24 in this case) in the storing unit 43 in S6. After finishing storing the interface information, the storing controller 42 reports to the network controller 40 that it is finished storing the interface information in S7.

Next, after receiving the notification for allowing to perform printing, the PC PC_A1 transfers print data in S8. After the first transceiver 11 receives the print data, the print data is transferred to the application unit 41 via the network controller 40 in S9 and S10. In this embodiment, the application unit 41 is a print application. Based on the received print data, the application unit 41 controls printing by the print engine and print unit to generate a printed matter corresponding to the print data.

Next, after finishing printing, the application unit 41 transfers a notification that it is finished to perform printing to the PC PC_A1 via the network controller 40 and the first transceiver 11 in S13, S16, S14, and S15). As a result, a sequence of printing by the network communication system in this embodiment ends.

Here, after transferring the print data to the application unit 41, the network controller 40 requests the storing controller 42 to store the application usage information in S11. After receiving the request to store application usage information, as described before with reference to Table 10, the storing controller 42 controls storing the application usage information including an interface name being used (i.e., the first transceiver 11 in this case), network address of the interface being used (i.e., 192.168.10.100/24 in this case), an application name being used, "start date/time and end date/time" corresponding to a period when the application is used, and "status" indicating an execution result of the job in the storing unit 43 in S12. After finishing controlling storing the application usage information in the storing unit 43, the storing controller 42 reports to the network controller 40 that it is finished storing the application usage information in S16.

In the network communication system described above in this embodiment, it is possible to record and manage the application usage information of the application running on the information processing apparatus such as the MFP 1 and a laser printer etc. that multiple different networks are connected for each network interface. Consequently, at intended timing, it is possible to provide the application usage information to users and administrators in addition to achieving effects similar to the effects achieved in the first embodiment described before.

Third Embodiment

Next, a network in this embodiment is described below. As described before in the second embodiment, in the network communication system in this embodiment, the application (such as scan application and copy application etc.) usage information and interface information recorded in units of each network interface may be provided to users etc. via a display (a display unit). It should be noted that only that configuration is different between the embodiments described before and the third embodiment described below. Therefore, first, only the different configuration is described below, and the redundant descriptions are omitted.

Figure 15:
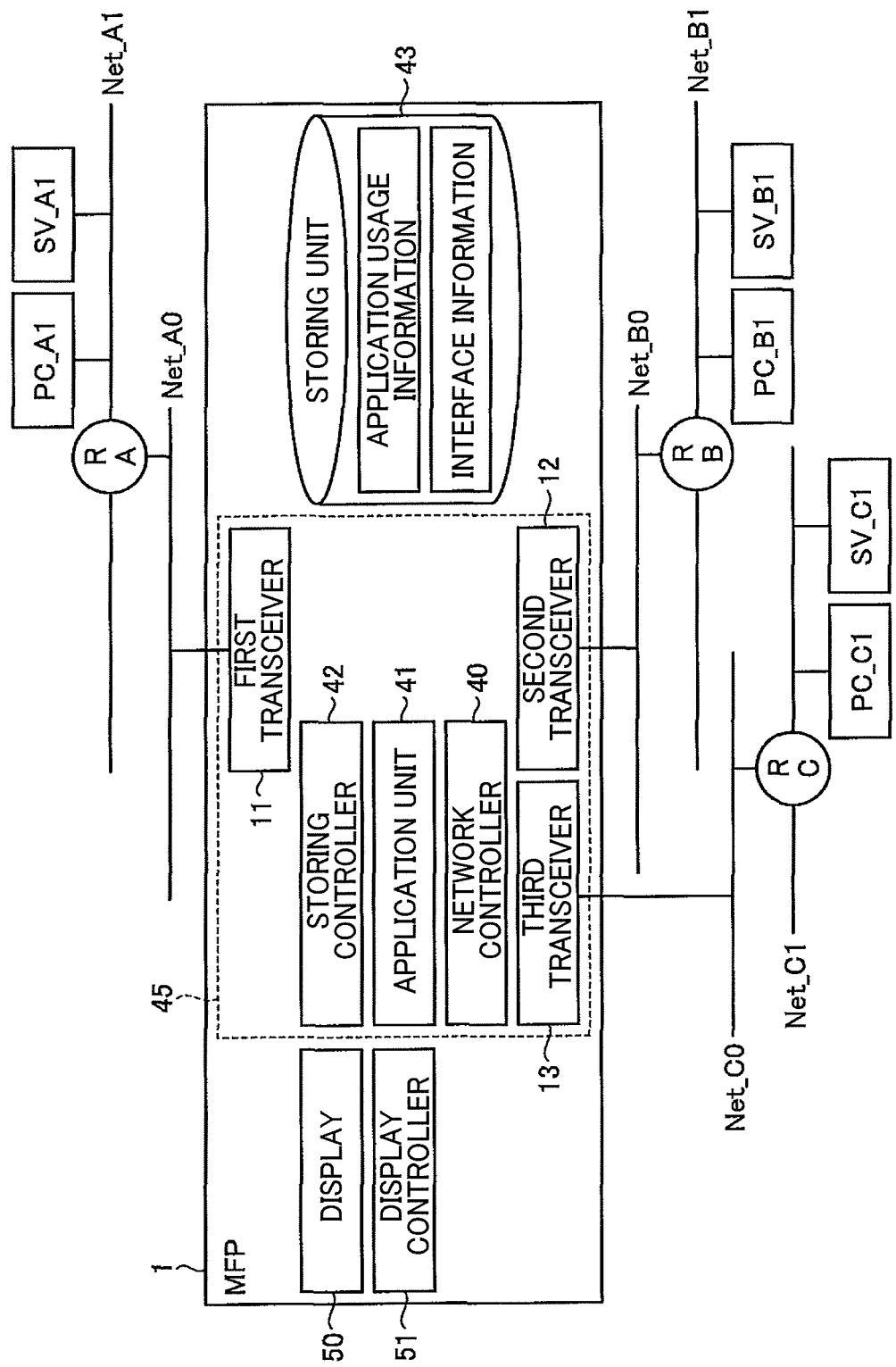
FIG. 15 is a diagram illustrating a configuration of a network communication system as an embodiment of the present invention.

FIG. 15 is a block diagram illustrating a substantial part of the MFP 1 located in the network communication system in this embodiment. As illustrated in FIG. 15, the MFP 1 located in the network communication system in this embodiment further includes a display 50 and a display controller 51 in addition to the configuration of the MFP 1 included in the network communication system in the second embodiment described before. For example, a liquid crystal display (LCD) or an organic electroluminescence (EL) display may be used for the display 50.

For example, after commanding to display the application usage information by user operation via an input device, the display controller 51 refers to the application usage information stored in the storing unit 43 and controls displaying "usage log" indicating application usage status for each of the transceivers 11 to 14 on the display 50.

FIG. 16 is a diagram illustrating a screen displaying the usage log in this embodiment. In FIG. 16, usage log displayed when it is commanded to display all usage states of transceivers (interfaces) 11 to 13 by user operation etc. is illustrated. In this case, based on the application usage information stored in the storing unit 43, the display controller 51 controls displaying information on application being used via each of the transceivers 11 to 14 on the display 50.

In FIG. 16, it is indicated that the first transceiver 11 (Net_A1) whose network address is "192.168.1.100/24" is used for communication using the print application on Mar. 29, 2017 and the printing finished without problems. In addition, in FIG. 16, it is indicated that the second transceiver 12 (Net_B1) whose network address is "172.16.10.11/24" is used for communication using the scan application on Mar. 29, 2017 and the scanning failed.

FIG. 17 is a diagram illustrating a screen displaying the usage log in this embodiment. In FIG. 17, usage log of the transceiver (interface) commanded to display by user operation etc. is illustrated. In this case, the display controller 51 refers to application information corresponding to the transceiver specified by user etc. stored in the storing unit 43 to generate usage log corresponding to the transceiver specified by the user etc. and control displaying the usage log on the display 50.

In FIG. 17, usage log displayed when it is commanded to display the usage log corresponding to the first transceiver 11 by user operation etc. is illustrated. In this case, based on the application information stored in the storing unit 43, the display controller 51 generates usage log corresponding to the first transceiver 11 and displays the usage log on the display 50. In FIG. 17, as the usage log corresponding to the first transceiver 11 specified by user operation, it is indicated that the first transceiver 11 (Net_A1) whose network address is "192.168.1.100/24" is used for communication using the print application on Mar. 29, 2017 and the printing finished without problems.

In the network communication system described above in this embodiment, it is possible to record and manage the application usage information of the application running on the information processing apparatus such as the MFP 1 and a laser printer etc. that multiple different networks are connected for each network interface and display the application usage information for users and administrators at intended timing in addition to effects achieved in the embodiments described before.

Fourth Embodiment

A network communication system in this embodiment is described below. In the network communication system in this embodiment, in addition to the MFP 1 in the network communication system in the third embodiment described above, hardware as the image processing apparatus such as the scanner and the printer etc. are added. That is, for example, image processing functions such as the scanner and the printer etc. are added to the MFP 1 in this embodiment. It should be noted that only that configuration is different between the embodiments described before and the third embodiment described below. Therefore, first, only the different configuration is described below, and the redundant descriptions are omitted.

Figure 18:
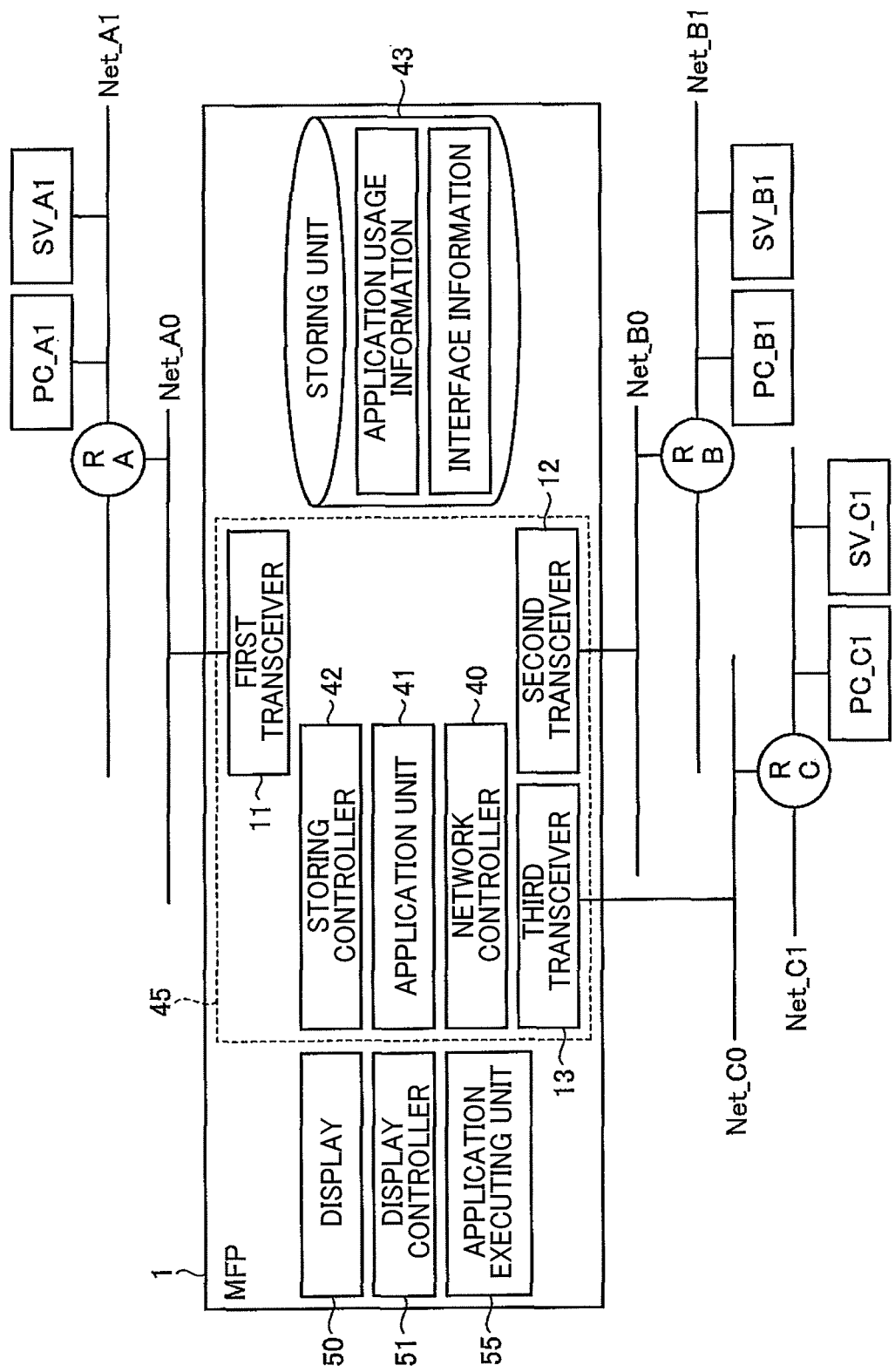
FIG. 18 is a block diagram illustrating a substantial part of the MFP located in the network communication system as an embodiment of the present invention.

FIG. 18 is a block diagram illustrating a substantial part of the MFP 1 located in the network communication system in this embodiment. As illustrated in FIG. 18, the MFP 1 located in the network communication system in this embodiment further includes an application executing unit 55 in addition to the configuration of the MFP 1 included in the network communication system in the second embodiment described before. As described before, the application executing unit 55 is hardware such as the scanner and the printer etc.

Figure 19:
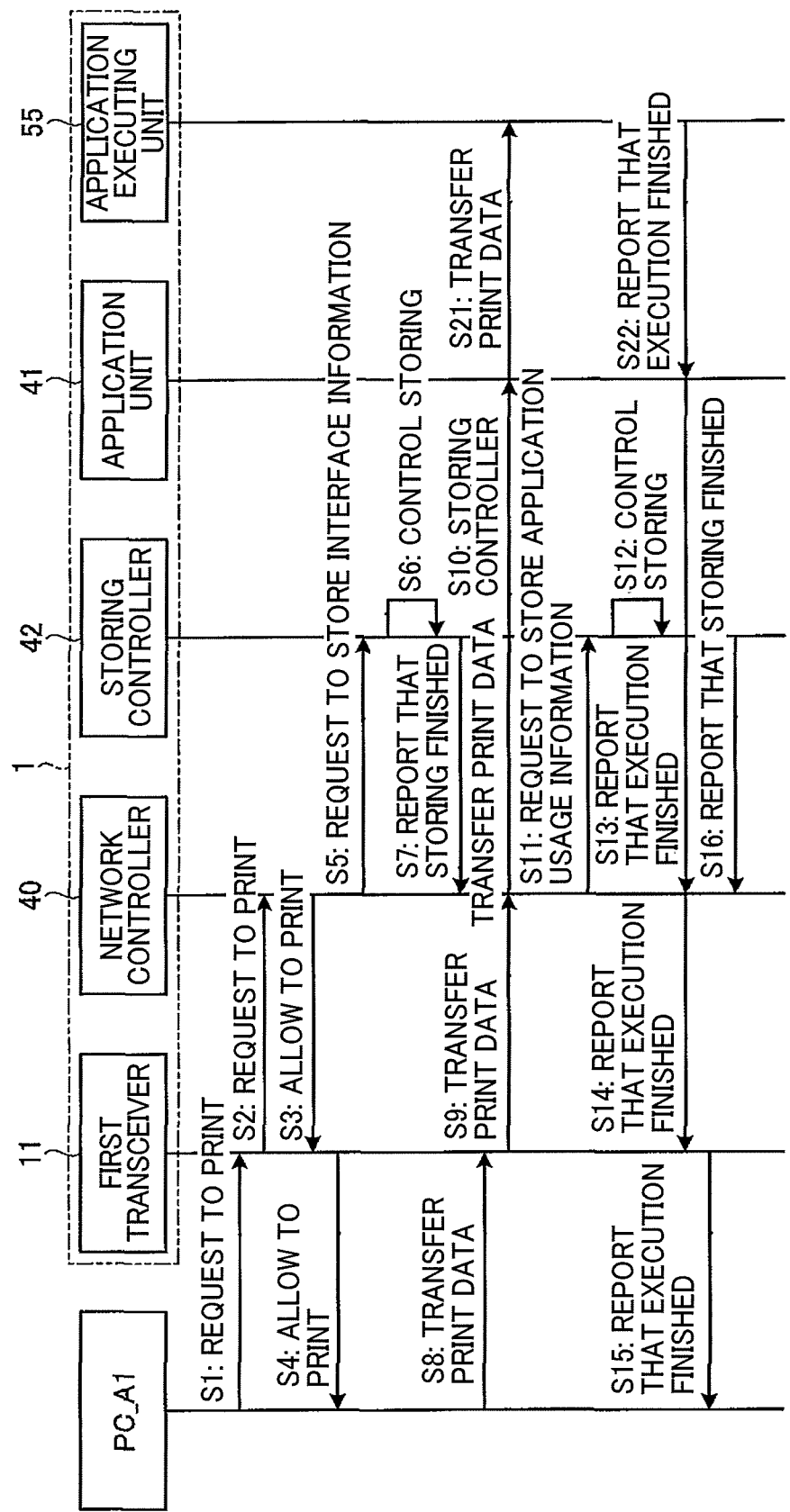
FIG. 19 is a flowchart illustrating an operation that an application executing unit performs a print job in the MFP located in the network communication system as an embodiment of the present invention.

FIG. 19 is a flowchart illustrating an operation that the application executing unit 55 (i.e., the printer in this case) performs a print job based on print data transferred by the PC PC_A1 by user operation in this embodiment. In the flowchart in FIG. 19, same step numbers are assigned to the operations same as the flowchart in FIG. 14, and the redundant descriptions are omitted.

Points different between the flowchart in FIG. 19 and the flowchart in FIG. 14 are, in the flowchart in FIG. 19, that the application executing unit 55 exists, the application unit 41 provides print data to the application executing unit 55 in S21, and the application executing unit 55 notifies the application unit 41 of finishing executing the print job in S22.

The network communication system in this embodiment may achieve effects similar to the network communication system described in the third embodiment.

Fifth Embodiment

A network communication system in this embodiment is described below. In the network communication system in this embodiment, in addition to the first transceiver 11, the second transceiver 12, and the third transceiver 13 described above, an interface for an external storage device for connecting the external storage device is included in the MFP 1. It should be noted that only that configuration is different between the embodiments described before and the fifth embodiment described below. Therefore, first, only the different configuration is described below, and the redundant descriptions are omitted.

Figure 20:
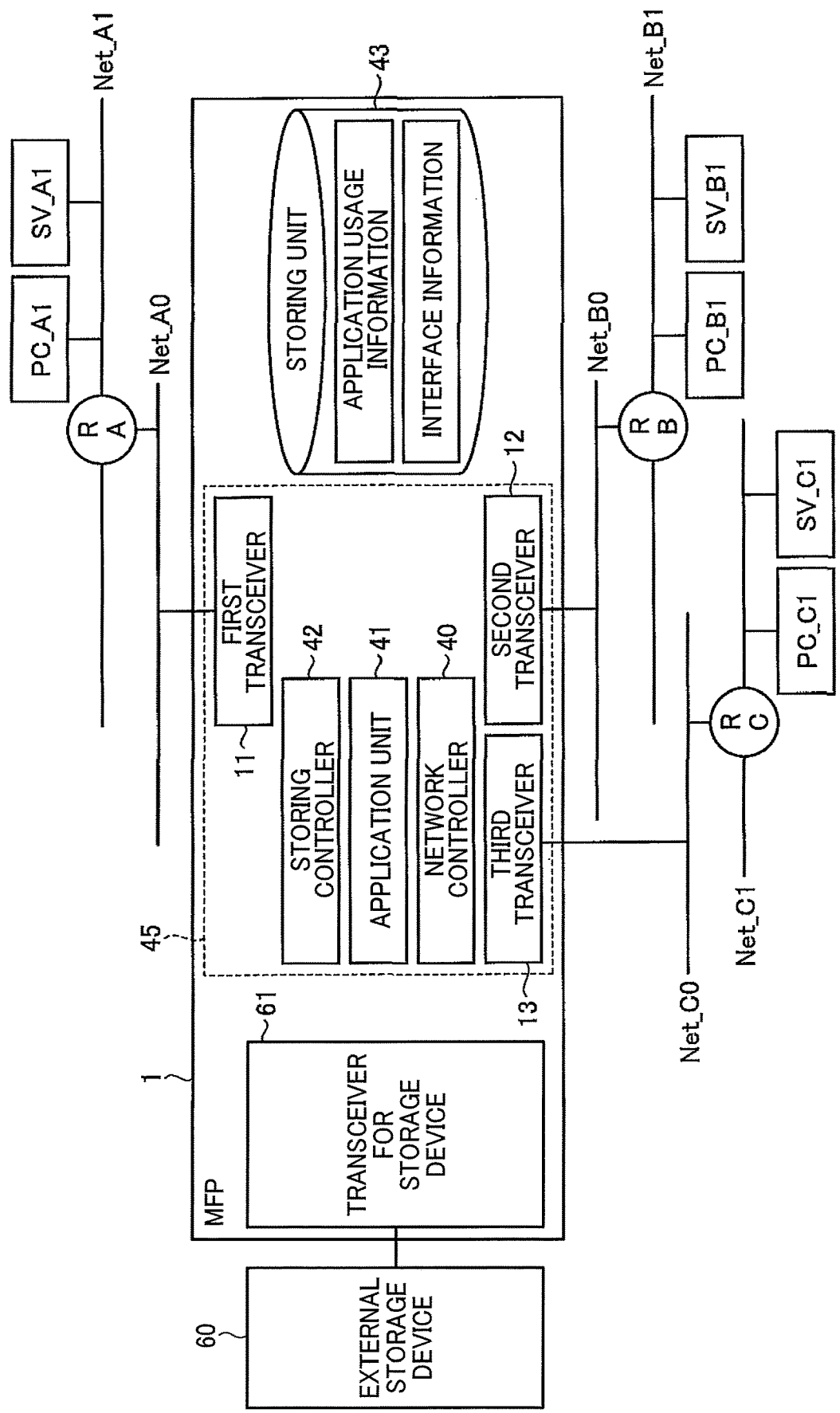
FIG. 20 is a block diagram illustrating the MFP including an interface for an external storage device in addition to the first transceiver, second transceiver, and third transceiver in a network communication system as an embodiment of the present invention.

The first transceiver 11, the second transceiver 12, and the third transceiver 13 are interfaces for networks. In addition, it is possible to include an interface other than the interface for networks in the MFP 1. FIG. 20 is a block diagram illustrating the MFP 1 including a transceiver for the external storage device 61 as the interface for an external storage device in addition to the first transceiver 11, second transceiver 12, and third transceiver 13 in this embodiment. Examples of the transceiver for external storage device 61 are an USB interface and a Peripheral Component Interconnect Express (PCIe) (registered trademark) etc.

If the USB interface is used as the transceiver for the external storage device 61, a USB memory is connected as the external storage device 60 in FIG. 20. In this case, the application unit 41 and the storing controller 42 etc. performs communication with the USB memory via the transceiver for the external storage device 61 to read print data etc. from the USB memory and write print data etc. in the USB memory. The application unit 41 reads the print data stored in the USB memory and controls printing described before.

In this case, as described in Table 11 below, the storing controller 42 controls storing the application usage information in the storing unit 43.

TABLE 11

| ID | Interface Name | Network address | Application name | Start/End date and time | Status |
|---|---|---|---|---|---|
| 1 | First transceiver | 192.268.10.100/24 | Print | 2017 Mar. 29 09:21-09:21 | Finished |
| 2 | Second transceiver | 172.16.10.11/24 | Scan | 2017 Mar. 29 09:23-09:25 | Failed |
| 3 | Third transceiver | 10.0.10.100/24 | Print | 2017 Mar. 29 15:00-15:01 | Finished |
| 4 | Transceiver for storage | | Print | 2017 Mar. 30 11:00-11:31 | Finished |

TABLE 11-continued

| ID | Interface Name | Network address | Application name | Start/End date and time | Status |
|---|---|---|---|---|---|
| | device (USB memory) | | | | |

In Table 11, application usage information whose ID is 4 is stored when the print application performs printing based on the print data read from the external storage device (USB memory) 60. In this case, it is indicated that printing is performed based on print data read from the external storage device 60 between 11:00 PM and 11:31 PM on Mar. 30, 2017.

The network communication system in this embodiment may achieve effects similar to the network communication system in the first embodiment described before.

Sixth Embodiment

A network communication system in this embodiment is described below. In the network communication system in this embodiment, it is possible to eject printed paper changing a destination of ejecting paper on the MFP 1 depending on a network that a PC requesting to perform printing is connected. It should be noted that only that configuration is different between the embodiments described before and the sixth embodiment described below. Therefore, first, only the different configuration is described below, and the redundant descriptions are omitted.

Figure 21:
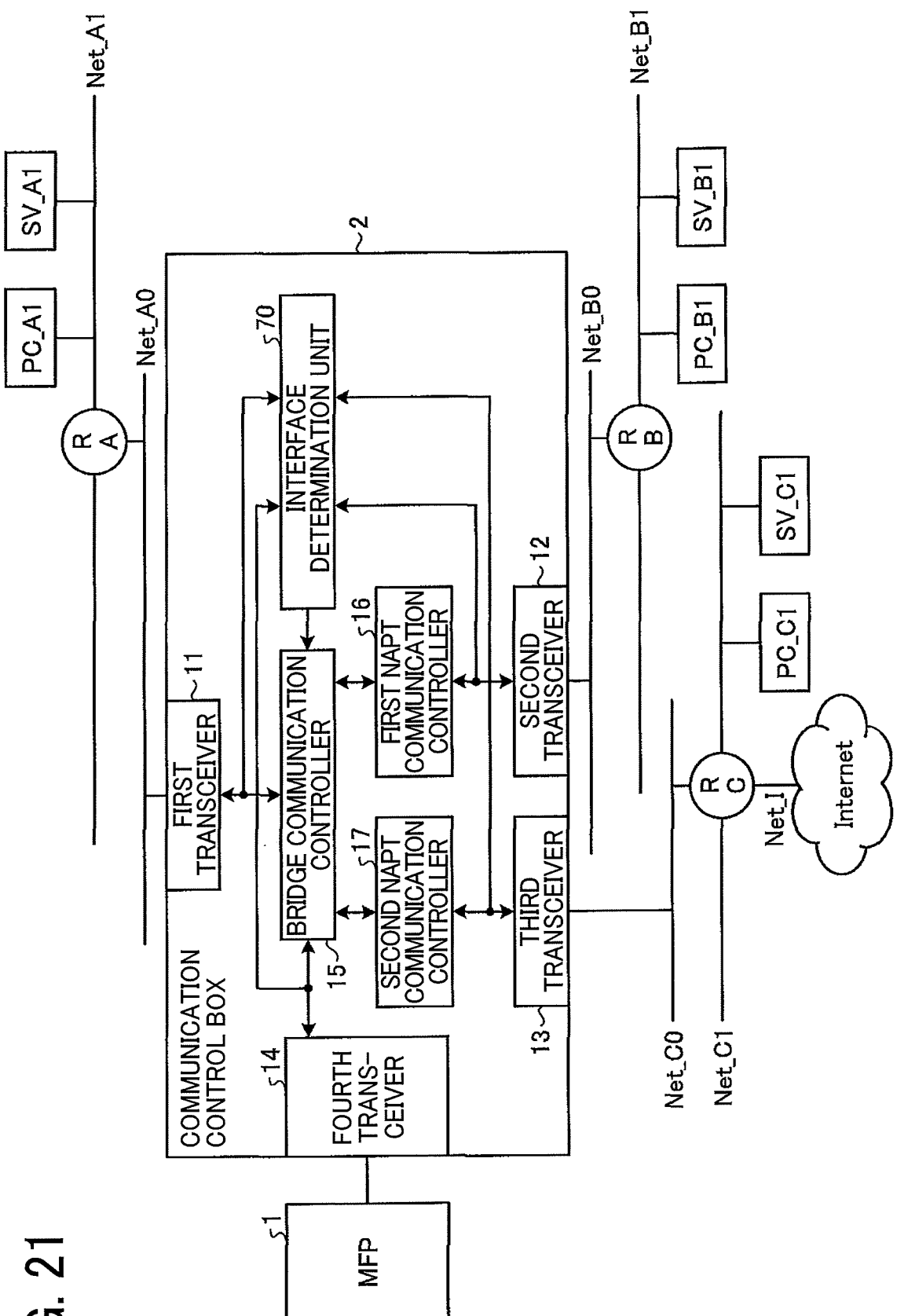
FIG. 21 is a block diagram illustrating a substantial part of the network control box located in the network communication system as an embodiment of the present invention.

FIG. 21 is a block diagram illustrating the network control box 2 connected outside the MFP 1 in this embodiment. As illustrated in FIG. 21, the communication control box 2 included in the network communication system in this embodiment transfers receiving information received via the first transceiver 11, the second transceiver 12, the third transceiver 13, and the fourth transceiver 14 to the MFP 1 via the fourth transceiver 14. In addition, the communication control box 2 included in the network communication system in this embodiment includes an interface determination unit 70 that determines a transceiver as an interface that received the receiving information (i.e, the first transceiver 11, the second transceiver 12, the third transceiver 13, or the fourth transceiver 14).

Figure 22:
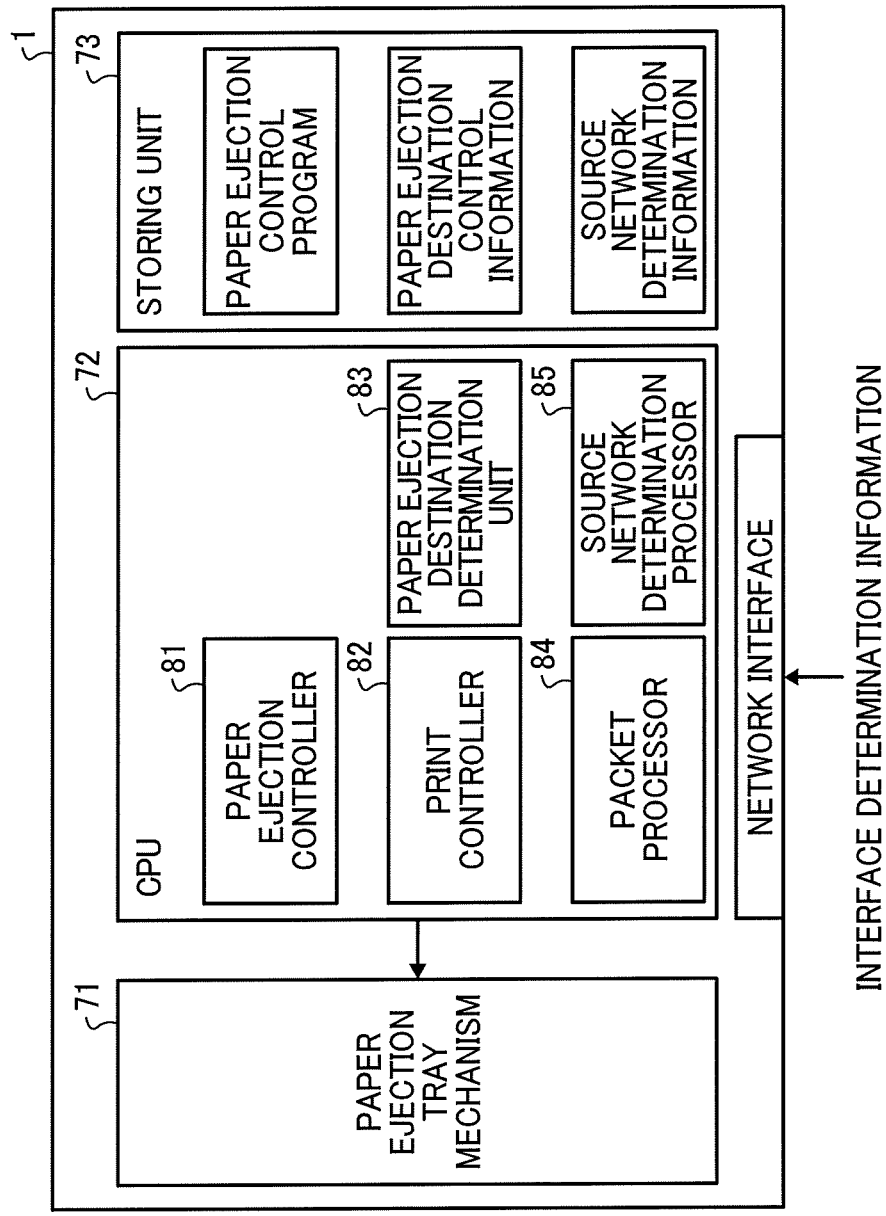
FIG. 22 is a block diagram illustrating a substantial part of the MFP located in the network communication system as an embodiment of the present invention.

FIG. 22 is a block diagram illustrating a substantial part of the MFP 1 located in the network communication system in this embodiment. As illustrated in FIG. 22, the MFP 1 located in the network communication system in this embodiment includes a paper ejection tray mechanism 71, a CPU 72, and a storing unit 73. The paper ejection tray mechanism 71 includes multiple paper ejection trays and ejects printed paper to a designated tray.

The storing unit 73 stores a paper ejection control program that ejects printed paper changing the destination of ejecting paper depending on a network, paper ejection destination control information that associates the transceiver that exchanges data with the paper ejection tray as the destination of ejecting paper, and source network determination information for determining network that a source apparatus is connected etc.

By executing the paper ejection control program stored in the storing unit 73, the CPU 72 implements functions such as a paper ejection controller 81, a print controller 82, a paper ejection destination determination unit 83, a packet processor 84, and a source network determination processor 85 described below.

Here, the components from the paper ejection controller 81 to the source network determination processor 85 described above are implemented by using software executing the paper ejection control program. However, all of the components or a part of the components may be implemented by hardware such as an integrated circuit (IC) etc.

In addition, the paper ejection control program may be provided by being stored in a computer readable, recording medium, such as a compact disc read only memory (CD-ROM) and a flexible disk (FD) in a file format installable or executable. In addition, the paper ejection control program may be provided by being stored in a computer readable, recording medium, such as a compact disc recordable (CD-R), a digital versatile disc (DVD), a Blu-ray (registered trademark) disc, and a semiconductor memory etc. In addition, the paper ejection control program may be provided by being installed via a network such as the Internet etc. In addition, the paper ejection control program may be provided by being installed in the ROM included in the apparatus preliminarily.

FIGS. 23A, 23B, 23C, and 23D are sequence charts illustrating an operation of controlling destination of paper ejection trays for each network exchanging data in the network communication system in this embodiment. In the sequence charts in FIGS. 23A and 23B, operations from S31 to S46 corresponds to operations that paper printed based on the print data transferred by the PC PC_A1 connected to the Net_A group that does not perform NAPT conversion described before to the paper ejection tray. By contrast, in the sequence charts in FIGS. 23C and 23D, operations from S51 to S67 corresponds to operations that paper printed based on the print data transferred by the PC PC_B1 connected to the Net_B group that performs NAPT conversion described before to the paper ejection tray.

First, operations from S31 to S46 are described below. Print data transferred by the PC PC_A1 connected to the Net_A group is received by the communication control box 2 via the first transceiver 11 in S31. The interface determination unit 70 in the communication control box 2 determines the transceiver that received the print data among the first transceiver 11, the second transceiver 12, the third transceiver 13, and the fourth transceiver 14 and transfers the interface determination information added to the print data to the bridge communication controller 15 in S32.

The bridge communication controller 15 transfers the print data including the interface determination information to the MFP 1 via the fourth transceiver 14 in S33. The print data includes IP address and port number of each apparatus that may become the source connected to the network and IP address and port number of the MFP 1. That is, in case of receiving the print data from the PC PC_A1 connected to the network Net_A1, IP address and port number of the PC PC_A1 connected to the network Net_A1 and IP address and port number of the MFP 1 are included. The packet processor 84 in the MFP 1 transfers the interface determination information and the IP address of the apparatus as the source included in the print data to the source network determination processor 85 and requests to determine which network the apparatus as the source is connected in S34.

Based on the interface determination information and the IP address of the source apparatus, the source network determination processor 85 refers to the source network determination information stored in the storing unit 73 to determine the network that the source apparatus is connected in S35 to S37. More specifically, just like Table 1, regarding the source network determination information, for example, it is indicated that an apparatus whose network address is 192.168.1.0/24 is connected to the network Net_A0 and another apparatus whose network address is 172.16.1.0/24 is connected to the network Net_B0, associating network address with a network and storing the source network determination information.

As a result, if IP address of the PC PC_A1 included in the print data is "192.168.10.xx", the source network determination processor 85 determines that the network that the PC PC_A1 as the source is connected is the network Net_A1. Similarly, if IP address of the apparatus as the source included in the print data is "172.16.1.xx", the source network determination processor 85 determines that the network that the source apparatus is connected is the network Net_B0. The source network determination processor 85 transfers the information on determining network connected to the source network determined as described above (i.e., the network determination information) to the packet processor 84 in S38.

Next, the packet processor 84 adds the network determination information to the print data and transfers the print data to the print controller 82 to request to print the print data in S39. The print controller 82 transfers the network determination information to the paper ejection destination determination unit 83 to request to determine destination of ejecting paper in S40. With reference to the paper ejection destination control information stored in the storing unit 73, the paper ejection destination determination unit 83 determines a paper ejection tray corresponding to the network indicated by the network determination information in S41 to S43. Table 12 below describes the paper ejection destination control information.

TABLE 12

| Connected network | Paper ejection destination |
|---|---|
| Net_A | Paper ejection tray A |
| Net_B | Paper ejection tray B |
| Net_C | Paper ejection tray C |

In Table 12 described above, as an example, it is defined that printed paper of the print data received from the apparatus connected to the network Net_A is ejected via the paper ejection tray A, printed paper of the print data received from the apparatus connected to the network Net_B is ejected via the paper ejection tray B, and printed paper of the print data received from the apparatus connected to the network Net_C is ejected via the paper ejection tray C.

The paper ejection destination determination unit 83 transfers the result of determining destination of ejecting paper determined as described above to the print controller 82 in S44. The print controller 82 controls a printing mechanism etc. to print an image on paper based on the print data and transfers the paper destination determination information to the paper ejection controller 81 to request to eject paper in S45. The paper ejection controller 81 controls the printing mechanism so that the printed paper is ejected to the paper ejection tray indicated by the paper ejection destination information described before with reference to Table 12 in S46. As a result, it is possible to eject printed paper changing paper ejection tray depending on the network that the print data is received.

Figure 23C:
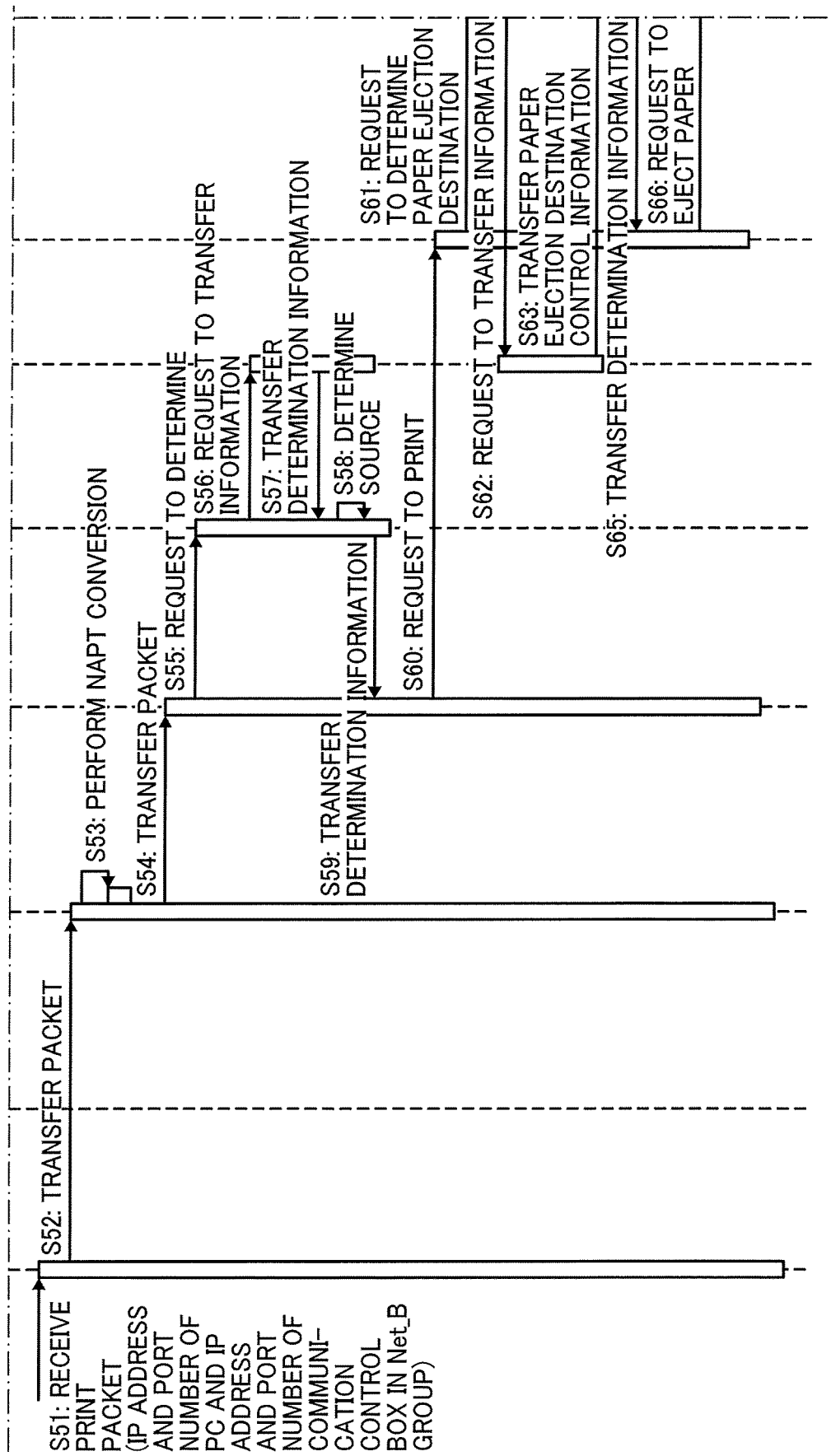
Figure 23D:
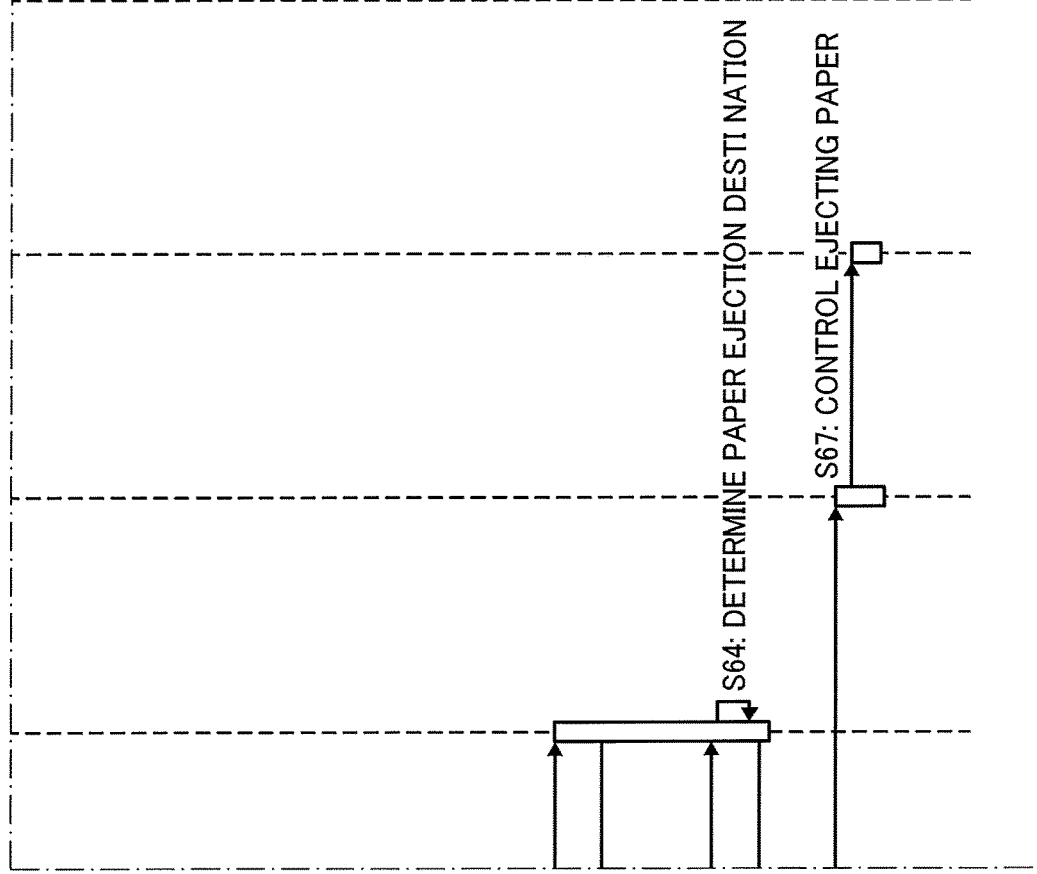

Next, operations in S51 to S67 in the sequence charts in FIGS. 23C and 23D are described below. Here, operations from S51 to S67 corresponds to operations that paper printed based on the print data transferred by the PC PC_B connected to the Net_B group that performs NAPT conversion described before to the paper ejection tray.

Print data transferred by the PC PC_B1 connected to the Net_B group is received by the communication control box 2 via the second transceiver 12 in S51. After performing the NAPT conversion described above on the print data received by the second transceiver 12 in S52 and S53, the first NAPT communication controller 16 in the communication control box 2 transfers the processed data to the MFP 1 via the bridge communication controller 15 and the fourth transceiver 14 in 554.

The packet processor 84 in the MFP 1 transfers the interface determination information and the IP address of the apparatus as the source included in the print data to the source network determination processor 85 and requests to determine which network the apparatus as the source is connected in S55.

Based on the IP address of the source apparatus, the source network determination processor 85 refers to the source network determination information stored in the storing unit 73 to determine the network that the source apparatus is connected in S56 to S58. More specifically, as described before with reference to Table 1, for example, if IP address of the PC PC_B1 included in the print data is "172.16.1.xx", the source network determination processor 85 determines that the network that the PC PC_B1 as the source is connected is the network Net_B0. Similarly, if IP address of the apparatus as the source included in the print data is "172.16.10.xx", the source network determination processor 85 determines that the network that the source apparatus is connected is the network Net_B1. The source network determination processor 85 transfers the information on determining network connected to the source network determined as described above (i.e., the network determination information) to the packet processor 84 in S59.

Next, the packet processor 84 adds the network determination information to the print data and transfers the print data to the print controller 82 to request to print the print data in S60. The print controller 82 transfers the network determination information to the paper ejection destination determination unit 83 to request to determine destination of ejecting paper in S61. With reference to the paper ejection destination control information (described in Table 12) stored in the storing unit 73, the paper ejection destination determination unit 83 determines a paper ejection tray corresponding to the network indicated by the network determination information in S62 to S64.

The paper ejection destination determination unit 83 transfers the result of determining destination of ejecting paper determined based on the paper ejection destination control information to the print controller 82 in S65. The print controller 82 controls a printing mechanism etc. to print an image on paper based on the print data and transfers the paper destination determination information to the paper ejection controller 81 to request to eject paper in S66. The paper ejection controller 81 controls the printing mechanism so that the printed paper is ejected to the paper ejection tray indicated by the paper ejection destination information described before with reference to Table 12 in S67. As a result, it is possible to eject printed paper changing paper ejection tray depending on the network that the print data is received.

As described above, in the network communication system in this embodiment, it is possible to determine the source network based on the source information on the network and determine the paper ejection destination tray based on the determined source network. Consequently, it is possible to eject printer paper selecting the paper ejection tray for each network that the apparatus requesting to perform printing is connected. In addition, it is possible to achieve effects similar to the network communication system in the embodiments described before.

The embodiment described above provides the communication control apparatus that enables communication beyond the network apparatus such as the router apparatus located at least in one network among the multiple networks connected to one communication apparatus maintaining network security.

The present invention also encompasses a communication control method performed by a communication control apparatus. The method includes the steps of controlling communicating transmission-and-reception information between at least one communication apparatus and a network apparatus located in each of multiple networks for each of the multiple networks, acquiring operation determination information corresponding to the transmission-and-reception information from a memory storing the operation determination information for determining a way of processing the transmission-and-reception information, and controlling communication between the communication apparatus and the network apparatus located in the network by performing an operation corresponding to the operation determination information being acquired.

It should be noted that the case that the computer apparatus reads and executes the program code is just one example to implement the functional units in the embodiments described above. In addition, in accordance with instructions by the program code, an operating system (OS) running on the computer apparatus may perform a part of the operations or all operations. Furthermore, the functional units described in the above embodiments may obviously be implemented by performing those operations.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A communication control apparatus for controlling communication between at least one communication apparatus and a network apparatus residing on one network among a plurality of networks, comprising:
a plurality of communication controllers respectively provided for the plurality of networks, each communication controller including:
a memory that stores operation determination information to be used for determining processing to be performed on transmission-and-reception information, the transmission-and-reception information to be transmitted or received by the communication controller with respect to other communication controller or the network apparatus on the network; and
circuitry to acquire the operation determination information in response to receiving the transmission-and-reception information, and to perform operation corresponding to the acquired operation determination information on the transmission-and-reception information,
wherein each of the plurality of communication controllers controls communication between the communication apparatus and the network apparatus residing on the network by performing the operation corresponding to the acquired operation determination information,
wherein, when the transmission-and-reception information is received from an outside of the communication control apparatus, the circuitry:
converts a first IP address of the transmission-and-reception information into a second IP address used within the communication control apparatus for communication within the communication control apparatus; and
converts the second IP address of the transmission-and-reception information back to the first IP address used outside the communication control apparatus for transfer to the outside of the communication control apparatus.

2. The communication control apparatus according to claim 1, wherein the circuitry further determines whether or not to convert the IP address of the transmission-and-reception information depending on a status of a session on the network.

3. The communication control apparatus according to claim 1,
wherein the circuitry further determines whether or not to convert the IP address of the transmission-and-reception information depending on an MAC address of the network apparatus as a source of the information.

4. The communication control apparatus according to claim 1,
wherein the circuitry further determines whether or not to convert a network address of the transmission-and-reception information based on the transmission-and-reception information being received.

5. The communication control apparatus according to claim 1,
wherein the circuitry acquires the operation determination information corresponding to the transmission-and-reception information being received from the corresponding network apparatus by using at least one of a source IP address and a destination IP address included in the transmission-and-reception information being received.

6. The communication control apparatus according to claim 1,
wherein the transmission-and-reception information includes a communication port number.

7. The communication control apparatus according to claim 1,
wherein the transmission-and-reception information includes a network interface that inputs the transmission-and-reception information.

8. The communication control apparatus according to claim 1,
wherein the circuitry configures the operation determination information stored in the memory based on information provided via an external apparatus.

9. The communication control apparatus according to claim 1,
wherein the circuitry restricts access from the outside with reference to an access control rule being configured.

10. The communication control apparatus according to claim 1,
wherein the circuitry further stores, in the memory, application usage information that associates information indicating one of a plurality of applications running on the communication apparatus being used with information indicating one of the plurality of networks that exchanges data processed by the application being used.

11. The communication control apparatus according to claim 1,
wherein the circuitry further:
reads the application usage information from the memory; and
displays the application usage information being read on a display.

12. The communication control apparatus according to claim 1,
wherein the communication apparatus has a function of processing an image.

13. The communication control apparatus according to claim 1,
wherein the communication apparatus includes an interface for connecting the communication apparatus to an external storage device.

14. The communication control apparatus according to claim 12,
wherein the circuitry further:
detects one of the plurality of networks that receives a request for printing; and
causes printed matter corresponding to the request for printing to be ejected on an ejection tray corresponding to the network that receives the request for printing.

15. A network communication system, comprising:
at least one communication apparatus;
a network apparatus that resides on one network among a plurality of networks; and
a communication control apparatus to control communication between the communication apparatus and the network apparatus,
wherein the communication control apparatus comprises:
a plurality of communication controllers respectively provided for the plurality of networks, each communication controller including:
a memory that stores operation determination information to be used for determining processing to be performed on transmission-and-reception information, the transmission-and-reception information to be transmitted or received by the communication controller with respect to other communication controller or of the network apparatus on the network; and
circuitry to acquire the operation determination information in response to receiving the transmission-and-reception information, and to perform operation corresponding to the acquired operation determination information on the transmission-and-reception information, wherein, when the transmission-and-reception information is received from an outside of the communication control apparatus, the circuitry:
converts a first IP address of the transmission-and-reception information into a second IP address used within the communication control apparatus for communication within the communication control apparatus; and
converts the second IP address of the transmission-and-reception information back to the first IP address used outside the communication control apparatus for transfer to the outside of the communication control apparatus.

16. A non-transitory, computer-readable recording medium storing a program that, when executed by one or more processors of a communication control apparatus, causes the processors to implement a method of controlling communication between at least one communication apparatus and a network apparatus residing on one network among a plurality of networks, using a plurality of communication controllers in the communication control apparatus that are respectively provided for the plurality of networks, the method comprising:
storing, in a memory of each communication controller, operation determination information to be used for determining processing to be performed on transmission-and-reception information, the transmission-and-reception information to be transmitted or received by the communication controller with respect to other communication controller or the network apparatus on the network;

receiving, with the communication control apparatus, transmission-and-reception information;

acquiring, with the communication control apparatus, the operation determination information that corresponds to the transmission-and-reception information being received from the memory; and performing, with the communication control apparatus, operation corresponding to the acquired operation determination information on the transmission-and-reception information, wherein, when the communication control apparatus receives the transmission-and-reception information from an outside of the communication control apparatus, the method further comprises:

converting internally to the communication control apparatus a first IP address of the transmission-and-reception information into a second IP address used within the communication control apparatus for communication within the communication control apparatus; and converting internally to the communication control apparatus the second IP address of the transmission-and-reception information back to the first IP address used outside the communication control apparatus for transfer to the outside of the communication control apparatus.

17. The communication control apparatus according to claim 1, wherein the circuitry blocks forwarding of the transmission-and-reception information for a session that has not yet been established through handshaking.

18. The communication control apparatus according to claim 1, wherein the circuitry blocks forwarding of the transmission-and-reception information for a TCP session that has not yet been established through handshaking.

* * * * *